(12) United States Patent
Logothetis et al.

(10) Patent No.: US 9,300,496 B2
(45) Date of Patent: Mar. 29, 2016

(54) SYSTEM AND METHOD FOR DETERMINING MODULATION CONTROL INFORMATION AND A REFERENCE SIGNAL DESIGN TO BE USED BY A TRANSMITTER NODE

(71) Applicants: Airspan Networks Inc., Boca Raton, FL (US); Andrew Logothetis, Buckinghamshire (GB); Martin Lysejko, Surrey (GB)

(72) Inventors: Andrew Logothetis, Buckinghamshire (GB); Martin Lysejko, Surrey (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 142 days.

(21) Appl. No.: 14/355,829

(22) PCT Filed: Mar. 17, 2014

(86) PCT No.: PCT/GB2014/050835
§ 371 (c)(1),
(2) Date: May 1, 2014

(87) PCT Pub. No.: WO2014/155057
PCT Pub. Date: Oct. 2, 2014

(65) Prior Publication Data
US 2015/0304130 A1  Oct. 22, 2015

(30) Foreign Application Priority Data
Mar. 28, 2013 (GB) .................................. 1305789.8

(51) Int. Cl.
| | |
|---|---|
| *H04B 1/10* | (2006.01) |
| *H04B 7/04* | (2006.01) |
| *H04L 25/02* | (2006.01) |
| *H04L 1/00* | (2006.01) |
| *H04L 1/20* | (2006.01) |
| *H04L 5/00* | (2006.01) |

(52) U.S. Cl.
CPC ............ *H04L 25/024* (2013.01); *H04L 1/0003* (2013.01); *H04L 1/0006* (2013.01); *H04L1/0009* (2013.01); *H04L 1/0015* (2013.01); *H04L 1/203* (2013.01); *H04L 5/0048* (2013.01); *H04L 25/0226* (2013.01)

(58) Field of Classification Search
USPC .............. 455/69, 179.1, 182.3, 183.1, 184.1, 455/185.1
See application file for complete search history.

(56) References Cited

U.S. PATENT DOCUMENTS

| | | | | |
|---|---|---|---|---|
| 8,913,574 | B2 * | 12/2014 | Chen | H04B 7/0417 370/329 |
| 2010/0142459 | A1 | 6/2010 | Tu et al. | |
| 2010/0246696 | A1 | 9/2010 | Lomnitz et al. | |
| 2011/0176581 | A1 * | 7/2011 | Thomas | H04B 1/7075 375/146 |
| 2011/0176629 | A1 * | 7/2011 | Bayesteh | H04B 7/0417 375/267 |
| 2012/0014476 | A1 * | 1/2012 | Kuchi | H04B 7/024 375/296 |
| 2013/0202015 | A1 * | 8/2013 | Frank | H04B 7/0632 375/219 |
| 2013/0329664 | A1 * | 12/2013 | Kim | H04W 24/10 370/329 |
| 2014/0241450 | A1 * | 8/2014 | Prasad | H04B 7/0456 375/267 |

FOREIGN PATENT DOCUMENTS

| | | |
|---|---|---|
| JP | 2007312060 A | 11/2007 |
| WO | 2005081439 A1 | 9/2005 |

OTHER PUBLICATIONS

PCT Search Report and Written Opinion from PCT/GB2014/050835 mailed May 30, 2014, 14 pages.
Baltersee, Jens, et al., "Achievable Rate of MIMO Channels with Data-Aided Channel Estimation and Perfect Interleaving," IEEE J. on Selected Areas in Communications, vol. 19, No. 12, Dec. 2001, 11 pages.
Kyösti, Pekka et al.; IST-4-027756 Winner II, D1.1.2 V1.1, Winner II Channel Models, Part I Channel Models; Sep. 30, 2007; 82 pgs.

Block Error Rate Predictor

Jazwinski, Andrew H.; Stochastic Processes and Filtering Theory, Dover Publications, Inc., ©1970, Chapter 8, Applications of Linear Theory, pp. 266-272.

Ericsson, R1-031303, TSG-RAN WG1 #35, System-level evaluation of OFDM—further considerations, Lisbon, Portugal, Nov. 17-21, 2003, 6 pgs.

Nanda, Sanjiv et al., Frame Error Rates for Convolutional Codes on Fading Channels and the Concept of Effective Eb/No, in IEEE Transactions onf Vechcular Technology, vol. 47, No. 4, Nov. 1998, pp. 1245-1250.

Wan, Lei et al., A Fading-Insensitive Performance Metric for a Unified Link Quality Model, IEEE Wireless Communications and Networking Conference, vol. 4, Apr. 3-6, 2006, pp. 2110-2114.

Sayana, Krishna et al., Link Performance Abstraction based on Mean Mutual Informaiton per Bit (MMIB) of the LLR Channel, IEEE 802.16 Broadband Wireless Access Working Group, May 3, 2007, 22 pgs.

Cioffi, John M., A Multicarrier Primer, 1991, 18 pgs.

Tong, Lang et al., Pilot-Assisted Wireless Transmissions, IEEE Signal Processing Magazine, Nov. 2004, pp. 12-25.

Adireddy, Srihari et al., Optimal Placement of Training for Frequency-Selective Block-Fading Channels, IEEE Transcations on Information Theory, vol. 48, No. 8, Aug. 2002, pp. 2338-2353.

Ma, Xiaoli et al., Optimal Training for MIMO Frequency-Selective Fading Channels, IEEE Transactions on Wireless Communications, vol. 4, No. 2, Mar. 2005, pp. 453-466.

Negi, Rohit et al., Pilot Tone Selection for Channel Estimation in a Mobile OFDM System, IEEE Transactions on Consumer Electronics, vol. 44, No. 3, Aug. 1998, pp. 1122-1128.

Zhang, Wei et al., On the Number of Pilots for OFDM System in Multipath Fading Channels, IEEE International Conference on Acoustics, Speech, and Signal Processing, 2004 Proceedings, May 17-21, 2004, pp. IV—381-384.

Search Report from corresponding GB Application No. GB1305789. 8, Oct. 1, 2013, 3 pgs.

* cited by examiner

*Primary Examiner* — Blane J Jackson

(74) *Attorney, Agent, or Firm* — Haynes Beffel & Wolfeld LLP

(57) ABSTRACT

A method and system are provided for determining modulation control information and a reference signal design to be used by a transmitter node when generating a transmit signal to transmit from a transmitter (logical antenna) of the transmitter node over a channel of a wireless link to a recipient node. The modulation control information is used by the transmitter node to convert source data into an information bearing signal, and the information bearing signal is combined with a reference signal conforming to the reference signal design in order to produce the transmit signal. The method comprises (a) selecting a candidate reference signal design from a plurality of candidate reference signal designs, (b) determining channel state information for the channel, (c) determining, from the channel state information, signal to noise ratio information for said channel, and (d) for each of a plurality of candidate modulation control information, using the signal to noise ratio information to determine a quality indication for said channel. Steps (a) to (d) are then repeated for each candidate reference signal design in said plurality. Thereafter a winning quality indication is selected from the determined quality indications, and the combination of candidate reference signal design and candidate modulation control information associated with the winning quality indication is then output to the transmitting node. By such an approach, quality indications can be established for each combination of possible reference signal design and possible modulation control information, and hence not only is the inherent channel estimation accuracy achievable using each possible reference signal design considered, but also the data transmission efficiency and robustness to channel effects of each possible modulation control information is also taken into account.

32 Claims, 18 Drawing Sheets

Block Error Rate Predictor

Transmitted data and pilot subcarriers within a resource block for 2TX

Transmitted data and pilot subcarriers within a resource block for 2TX

Transmitted data and pilot subcarriers within a resource block for 2TX

FIG. 9 (continued)

Received data and pilot subcarriers within a resource block for 2TX

FIG. 10

Received data and pilot subcarriers within a resource block for 2TX

FIG. 10 (continued)

Received data and pilot subcarriers within a resource block for 2TX

FIG. 10 (continued)

SYSTEM AND METHOD FOR DETERMINING MODULATION CONTROL INFORMATION AND A REFERENCE SIGNAL DESIGN TO BE USED BY A TRANSMITTER NODE

FIELD OF THE INVENTION

The present invention relates to a system and method for determining modulation control information and a reference signal design to be used by a transmitter node when generating a transmit signal to transmit from a transmitter of the transmitter node over a channel of a wireless link to a recipient node.

BACKGROUND OF THE INVENTION

Within a wireless network, there will typically be a plurality of nodes that need to communicate with each other, and wireless communications links are established between the various nodes to support such communications. Considering a wireless telecommunications network, for a downlink communication path a transmitter node (for example a base station (BS)) may need to communicate with a plurality of recipient nodes (such as mobile stations(MSs)/items of end user equipment(UEs)). Similarly, for an uplink communication path multiple transmitter nodes (for example MSs/UEs) may need to communicate with a particular recipient node (for example a BS).

Each transmitter node may provide one or more transmitters, and each transmitter may be formed of one or more physical antennas. For each antenna, electric signals are converted into electro-magnetic (radio) waves. One or more physical antennas may be grouped to form a logical antenna. For each logical antenna, a channel of wireless communication will be provided.

A wireless signal (such as a radio-frequency (RF) signal) traversing through such a wireless communication channel is subject to multiple reflections, diffractions and scattering effects. Hence, the original signal transmitted from a logical antenna will reach a destination receive antenna via multiple paths. The signal observed at the receive antenna will be the superimposition of the attenuated, phase shifted and delayed replicas of the original transmitted signal.

Channel estimation is a process used to characterise the effects of the channel, and typically a recipient node will include a channel estimator stage for generating channel state information (CSI), such CSI comprising channel estimates such as the per-path complex attenuation coefficients and path delays. In addition, the CSI may also comprise an error covariance matrix, providing a measure of the estimated accuracy of the channel estimates.

The CSI together with the wireless signal received over the channel are subsequently fed into a channel equaliser within the recipient node, which is responsible for reversing the effects of the multipath channel, seeking to restore the received signal to match as closely as possible to the original transmitted signal. The process of using the phase of the channel during equalisation is known as coherent detection.

Whilst it is possible to compute the CSI directly from the received signal, utilising the second and in some instances higher order statistics of the signal, the complexity of such a scheme is prohibitively high, requiring long processing periods to guarantee convergence with slow adaptation capabilities, making this scheme unsuitable for rapidly time-varying channels.

Many systems (including most telecommunication systems in service today) do not seek to compute the CSI directly from the received signal, but instead use pilot-aided channel estimation (PACE) techniques. PACE schemes rely on multiplexing the information bearing data with a known reference signal, the reference signal typically consisting of a number of symbols called pilots or reference symbols. The reference symbols are utilised by the receiver to compute channel estimates at the known locations of those reference symbols (often referred to as pilot locations) and then perform interpolation/prediction to estimate the channel at the data locations.

The accuracy of the channel estimates depends on the pilot density (the fraction of pilots to the total number of pilots and data symbols). As the pilot density increases, so does the quality of the channel estimates. However, increasing the pilot density has a detrimental effect on data throughput. In addition, channel estimation can also be improved by allocating more transmit power to the pilot symbols, but this comes at the expense of decreasing the signal to noise ratio for the data symbols. It is also well known that in certain types of radio channels, the pilot positions may also influence the quality of the channel estimates. Thus, there is a trade-off between the channel estimation accuracy and bandwidth efficiency.

Pilot design, i.e. the assignment of the pilot density, pilot locations and powers relative to data symbols, has been addressed in a variety of articles, for example:

1) L. Tong, B. M. Sadler and M. Dong, "Pilot-Assisted Wireless Transmission," Signal Processing Magazine, IEEE, vol. 21, no. 6, pp. 12-25, 2004.
2) S. Adireddy, L. Tong and H. Viswanathan, "Optimal placement of training for frequency-selective block-fading channels," Information Theory, IEEE Transactions on, vol. 48, no. 8, pp. 2338-2353, 2002.
3) X. Ma, L. Yang and G. B. Giannakis, "Optimal training for MIMO frequency-selective fading channels," Wireless Communications, IEEE Transactions on, vol. 4, no. 2, pp. 453-466, 2005.
4) R. Negi and J. Cioffi, "Pilot tone selection for channel estimation in a mobile OFDM system," Consumer Electronics, IEEE Transactions on, vol. 44, no. 3, pp. 1122-1128, 1998.
5) W. Zhang, X.-G. Xia and W.-K. Ma, "On the number of pilots for OFDM system in multipath fading channels," Acoustics, Speech, and Signal Processing, 2004. Proceedings. (ICASSP '04). IEEE International Conference on, vol. 4, pp. iv-381-iv-384, 2004.

As stated in article 1 above, the most commonly used design criteria for pilot-assisted transmission methods are based on 1. Information theoretic metrics (see articles 2 and 3),
2. Channel estimation (see article 4), or
3. Source estimation (see article 5).

Considering the information theoretic metrics approach, the Shannon capacity specifies the maximum rate across all possible transceiver designs at which information can be transmitted over a communication channel with an error probability that is arbitrary small assuming a sufficiently long code length. To make this metric more practical, the authors of the articles 2 and 3 constrained the channel estimator to be a linear minimum mean square error (MMSE) receiver, and then proceeded to link the mutual information with channel estimation and design training sequences that maximize a lower bound of the average mutual information for SISO (see article 2) and MIMO (see article 3) channels, respectively. For frequency-selective block fading channels in an orthogonal frequency division multiplexing (OFDM) system, these articles conclude that the optimal solution is to place the pilots equally apart using the same transmit power. Notwithstanding this powerful result, the information theoretic framework used by these articles fails to capture the system performance for practical coding and modulation schemes (MCS) used in wireless systems to generate the information bearing signal transmitted over the channel in combination with the pilot symbols.

The second approach identified above, namely the channel estimation approach, relies on deriving the channel estimates as a function of the pilots, and either minimise the Cramer-Rao bound (CRB) or the MMSE (see article 4) on the estimates. Not surprisingly, the same results as the previous method were obtained. Finally, the third and final method for pilot design was presented in article 5, where a closed-form solution of the average BER (bit error rate) as a function of the pilot spacing was found. The BER derived in article 5 is also for an OFDM system, but is only applicable for QPSK modulated signals. Higher order modulations are not considered, and most importantly coding is completely ignored.

The above approaches for pilot design hence have a number of limitations. In particular, they seek to optimise one particular sub-block of the receiver chain, namely the channel estimation block, but do not take account of the modulation and coding scheme intended to be used to transmit the data over the channel. However, the robustness of the information bearing signal to the channel effects will vary significantly dependent on the modulation and coding scheme used for the data. Accordingly such known pilot design techniques may provide a higher channel estimation accuracy than is actually necessary having regards to the modulation and coding scheme to be used for the data, and as mentioned earlier an increase in the channel estimation accuracy will generally have a detrimental effect on bandwidth efficiency, and accordingly will adversely affect throughput.

Further, in a real-world environment, the channel effects experienced within a channel will vary over time, and it would be desirable to provide a technique which could adapt the pilot design as necessary in order to compensate for such time varying effects.

SUMMARY OF THE INVENTION

Viewed from a first aspect, the present invention provides a method of determining modulation control information and a reference signal design to be used by a transmitter node when generating a transmit signal to transmit from a transmitter of the transmitter node over a channel of a wireless link to a recipient node, the modulation control information being used by the transmitter node to convert source data into an information bearing signal, and the information bearing signal being combined with a reference signal conforming to the reference signal design in order to produce said transmit signal, the method comprising: (a) selecting a candidate reference signal design from a plurality of candidate reference signal designs; (b) determining channel state information for said channel, said channel state information comprising a channel estimate providing an indication of how channel effects will modify the transmit signal as it is transmitted over said channel, and the channel state information further comprising an estimated error in the channel estimate and an estimate of noise experienced within said channel, at least the estimated error being determined based on said selected candidate reference signal design; (c) determining, from the channel state information, signal to noise ratio information for said channel; d) for each of a plurality of candidate modulation control information, using the signal to noise ratio information to determine a quality indication for said channel; (e) repeating said steps (a) to (d) for each candidate reference signal design in said plurality; (f) selecting a winning quality indication from the determined quality indications; and (g) outputting to the transmitting node the combination of candidate reference signal design and candidate modulation control information associated with the winning quality indication.

In accordance with the present invention, a combination of reference signal design and modulation control information is produced, having regards to a particular quality indication specified for the channel. The quality indication can take a variety of forms, but in one embodiment is an indication of net throughput of the source data. Hence, in such embodiments, the combination of reference signal design and modulation control information produced by the method of the present invention can be chosen so as to optimise the net throughput. In accordance with the method of the present invention, quality indications can be established for each combination of possible reference signal design and possible modulation control information, and hence not only is the inherent channel estimation accuracy achievable using each possible reference signal design considered, but also the data transmission efficiency and robustness to channel effects of each possible modulation control information is also taken into account.

In one embodiment, the transmitter of the transmitter node takes the form of a logical antenna, and the combination of candidate reference signal design and candidate modulation control information output by the method of the present invention is used for transmitting data over the channel associated with the logical antenna. In some embodiments, the transmitter node may have multiple logical antennae, each having an associated channel, and in such embodiments the above described method can be used to separately determine modulation control information and a reference signal design to be used for each channel. Typically, each channel will have a unique reference signal design.

Furthermore, there may be multiple transmitting nodes within the wireless network, each having one or more logical transmit antennae, and each logical transmit antenna having an associated channel. In such embodiments, the above process can be repeated for every channel within the wireless network in order to allocate modulation control information and a reference signal design for each channel. Whilst in one embodiment the above-mentioned process may be performed sequentially for each channel, it can alternatively be performed at least partly in parallel for each of the channels within the wireless network.

The channel state information for the channel can be calculated in a variety of ways. In one embodiment, the transmit signal is transmitted over the channel within a plurality of resource elements, and the method comprises determining at said step (b), as the channel state information for said channel, channel state information for each resource element.

In one such embodiment, the method further comprises, at said step (c), calculating a vector providing separate signal to noise information for each resource element.

The reference signal design can take a variety of forms. However, in one embodiment, the reference signal design is a pilot signal design identifying at least locations at which pilots are to be included within the transmit signal. In one particular embodiment, the transmit signal is transmitted over the channel within a resource block comprising a plurality of resource elements, and the pilot signal design identifies which resource elements are to contain pilots.

The pilots can be constructed in a variety of ways, but in one embodiment the pilots are pilot symbols, each pilot symbol occupying one resource element.

In one embodiment, in addition to identifying the locations at which pilots are to be included within the transmit signal, the reference signal design further identifies a transmit power to be used for transmitting said pilots within the transmit signal. This provides additional flexibility with regards to the reference signal design. For example, channel estimation accuracy can be improved by increasing the transmit power used to transmit the pilots within the transmit signal.

The modulation control information can take a variety of forms. In one embodiment, the modulation control information identifies at least a constellation mapping to be used to generate the information bearing signal from a coded version of the source data.

In one embodiment, the modulation control information further identifies a channel coding to be used to convert the source data into the coded version of the source data.

The channel estimate used to form part of the channel state information determined at said step (b) can be derived in a variety of ways. However, in one embodiment, the channel estimate is obtained by a channel sounding process. As will be understood, the sounding process involves a given element (a base station or a mobile station/item of end user equipment) of the wireless network transmitting a known sounding signal, and corresponding elements (mobile stations/items of end user equipment or base stations, respectively) of the wireless network then receiving that sounding signal. On this basis, channel metrics can be derived from the sounding information. These channel metrics can take a number of forms including (but not limited to) channel impulse responses, complex channel frequency responses, frequency dependent co-variance matrices of the received signals, frequency dependent eigenmodes and so on. These metrics (or a combination of such metrics) provide a system wide view of the quality of the wireless channels in the network.

Such a channel sounding process can be performed in a variety of ways. In one embodiment, the channel sounding process is performed by a network controller of a wireless network in which the transmitter node and recipient node reside.

As an alternative to deriving the channel estimate from a channel sounding process, the channel estimate may alternatively be determined by the recipient node from a reference signal extracted from a received transmit signal.

There are a number of ways in which the estimated error in the channel estimate can be determined at said step (b). In one embodiment, the estimated error in the channel estimate is determined based on the selected candidate reference signal design and statistical data forming at least part of the channel estimate. In one embodiment, the first order statistics of the channel estimate (such as the channel frequency response) are not required when determining the estimated error in the channel estimate, and instead the estimated error can be determined by calculating an error covariance matrix based on the selected candidate reference signal design and second order statistics of the channel estimate, for example a frequency-selective a priori channel covariance matrix.

A predetermined feature of the selected candidate reference signal design can be used when calculating the error covariance matrix. In one embodiment where each candidate reference signal design is a pilot signal design identifying at least locations at which pilots are to be included within the transmit signal, the predetermined feature of the selected candidate reference signal design used in calculating the error covariance matrix is an observation matrix indicating the locations and strength of the pilots to be included within the transmit signal in accordance with that selected candidate reference signal design.

There are a number of ways in which the estimated error in the channel estimate may be determined at said step (b), but in one embodiment the estimated error in the channel estimate is determined using a Kalman filter operation.

There are number of locations within the wireless network where the above described method can be performed in order to determine modulation control information and a reference signal design to be used by a transmitter node. For example, in one embodiment, the method is performed within a network controller of the wireless network in which the transmitter node and recipient node reside. Alternatively, the method may be performed within the recipient node.

As mentioned earlier, the quality indication determined at said step (d) can take a variety of forms, but in one embodiment is an indication of net throughput of the source data. In one such embodiment, the step (d) comprises, for each of said plurality of candidate modulation control information, determining a block error rate prediction based on the signal to noise ratio information for the channel, and then performing a throughput determination operation on the block error rate prediction in order to determine said indication of net throughput.

In embodiments where each candidate reference signal design is a pilot signal design identifying at least locations at which pilots are to be included within the transmit signal, then the above-mentioned throughput determination operation may employ as inputs the block error rate prediction, an indication of the density of said pilots to be included in the transmit signal, and a spectral efficiency indication of the candidate modulation control information.

In one particular embodiment, the throughput determination operation performs the computation:

$$\text{indication of net throughput} = (1-\text{BLER}) \times (1-\text{PD}) \times \text{MC\_SE}$$

where BLER is the block error rate, PD is the pilot density for the selected candidate reference signal design, and MC_SE is the spectral efficiency of a currently selected candidate modulation control information.

This provides a particularly efficient mechanism for determining an indication of net throughput. In this particular arrangement, the higher the value of the net throughput indication, the higher the expected net throughput when using the currently considered combination of selected candidate reference signal design and selected candidate modulation control information. Accordingly, in such an embodiment, said step (f) comprises selecting as the winning quality indication the indication of net throughput that has the highest value from amongst all of the indications of net throughput calculated through performance of said steps (a) to (e).

In one embodiment, said step (c) involves calculating a vector providing separate signal to noise information for each resource element, and then, during said step (d), the step of determining a block error rate prediction comprises mapping said vector into a scalar effective signal to noise ratio using a selected block size identifying the number of resource elements considered to form a block, and then computing the block error rate prediction using the scalar effective signal to noise ratio, the block size and at least one parameter determined from a currently selected candidate modulation control information.

Whilst the earlier described the steps (a) to (d) could be performed sequentially for each combination of candidate reference signal design and candidate modulation control information, in one embodiment those steps are performed at least partially in parallel for different combinations of candidate reference signal design and candidate modulation control information, thereby improving the speed of operation of the method.

The channel estimate can take a variety of forms, but in one embodiment the channel estimate identifies one of a channel frequency response and a channel impulse response.

In one embodiment, the above described method can be re-performed whenever desired, for example on occurrence of one or more trigger conditions, and can be performed quickly enough to allow the combination of candidate reference signal design and candidate modulation control information that provides the best quality indication to be re-evaluated as frequently as necessary, so that over time the chosen reference signal design and chosen modulation control information can be altered in order to continue to provide the optimal combination as variations in the channel effects take place over time.

There are a variety of trigger conditions that may be used to cause the method to be re-performed in order to re-evaluate the appropriate combination of candidate reference signal design and candidate modulation control information to be used for any particular channel. For example, a global sounding process may be performed periodically during normal system operation, and this may be used as a trigger to re-perform the above described method for each channel within the wireless network. Similarly if a global event causes a change in the arrangement of the channels within the wireless network (for example a switch from spatial multiplexing to transmit diversity within a MIMO system), then the process can be re-performed. Additionally, certain local events may be used to re-perform the process for one or more particular channels within the wireless network. For example, individual recipient units may be arranged to provide information indicating when the packet error rate changes substantively, and such information may be used to re-trigger the performance of the above process for one or more specified channels.

Viewed from a second aspect, the present invention provides a system for determining modulation control information and a reference signal design to be used by a transmitter node when generating a transmit signal to transmit from a transmitter of the transmitter node over a channel of a wireless link to a recipient node, the modulation control information being used by the transmitter node to convert source data into an information bearing signal, and the information bearing signal being combined with a reference signal conforming to the reference signal design in order to produce said transmit signal, the system comprising: storage configured to store a plurality of reference signal designs; channel estimation and estimation variance circuitry configured to determine channel state information for said channel, said channel state information comprising a channel estimate providing an indication of how channel effects will modify the transmit signal as it is transmitted over said channel, and the channel state information further comprising an estimated error in the channel estimate and an estimate of noise experienced within said channel, at least the estimated error being determined based on a selected candidate reference signal design from said storage; signal to noise ratio evaluation circuitry configured to determine, from the channel state information, signal to noise ratio information for said channel; quality indication determination circuitry configured, for each of a plurality of candidate modulation control information, to use the signal to noise ratio information to determine a quality indication for said channel; the operations of the channel estimation and estimation variance circuitry, the signal to noise ratio evaluation circuitry and the quality indication determination circuitry being performed for each candidate reference signal design in said plurality; and selection circuitry configured to select a winning quality indication from the determined quality indications, and to output to the transmitting node the combination of candidate reference signal design and candidate modulation control information associated with the winning quality indication.

Viewed from a third aspect, the present invention provides a system for determining modulation control information and a reference signal design to be used by a transmitter node when generating a transmit signal to transmit from a transmitter of the transmitter node over a channel of a wireless link to a recipient node, the modulation control information being used by the transmitter node to convert source data into an information bearing signal, and the information bearing signal being combined with a reference signal conforming to the reference signal design in order to produce said transmit signal, the system comprising: storage means for storing a plurality of reference signal designs; channel estimation and estimation variance means for determining channel state information for said channel, said channel state information comprising a channel estimate providing an indication of how channel effects will modify the transmit signal as it is transmitted over said channel, and the channel state information further comprising an estimated error in the channel estimate and an estimate of noise experienced within said channel, at least the estimated error being determined based on a selected candidate reference signal design from said storage; signal to noise ratio evaluation means for determining, from the channel state information, signal to noise ratio information for said channel; quality indication determination means, for each of a plurality of candidate modulation control information, for using the signal to noise ratio information to determine a quality indication for said channel; the operations of the channel estimation and estimation variance means, the signal to noise ratio evaluation means and the quality indication determination means being performed for each candidate reference signal design in said plurality; and selection means for selecting a winning quality indication from the determined quality indications, and for outputting to the transmitting node the combination of candidate reference signal design and candidate modulation control information associated with the winning quality indication.

Viewed from a fourth aspect, the present invention provides a storage medium storing a computer program which, when executed on a computer, performs a method of determining modulation control information and a reference signal design to be used by a transmitter node in accordance with the first aspect of the present invention. In one embodiment, the storage medium may take the form of a non-transitory storage medium.

BRIEF DESCRIPTION OF THE DRAWINGS

The present invention will be described further, by way of example only, with reference to embodiments thereof as illustrated in the accompanying drawings, in which:

FIGS. 9 and 10 illustrate possible different pilot designs that can be used in accordance with the described embodiments.

DESCRIPTION OF EMBODIMENTS

Figure 1:
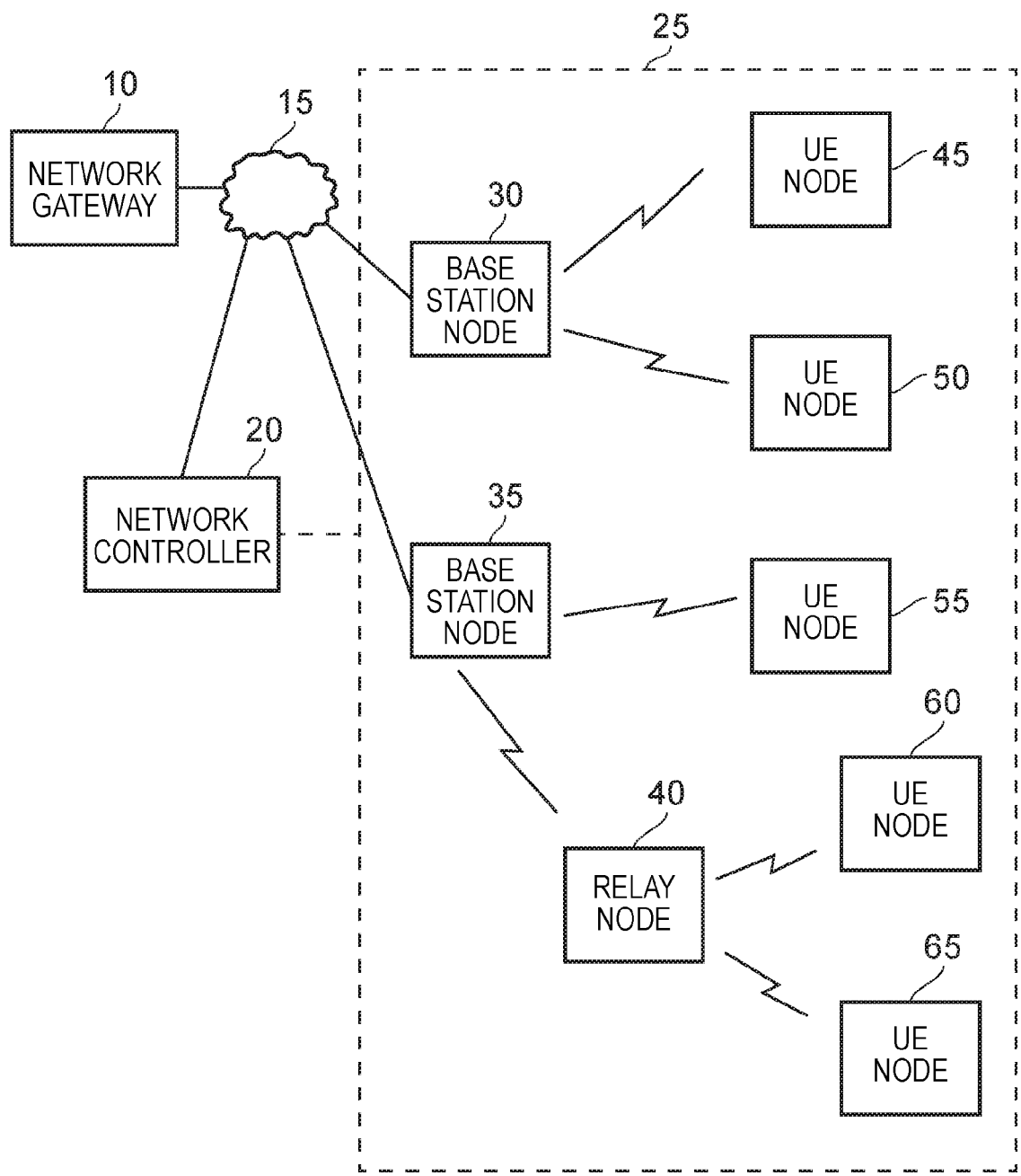
FIG. 1 schematically illustrates a wireless network in which techniques of embodiments of the present invention may be employed.

FIG. 1 schematically illustrates a wireless network in which the techniques of embodiments of the present invention may be employed. As shown, a number of base station nodes 30, 35, 40 are provided to communicate via a wireless air interface with a number of mobile stations/items of end user equipment 45, 50, 55, 60, 65. The items of end user equipment may be mobile or fixed, and any one of a number of known wireless communications protocols may be used to effect the wireless links between the base station nodes and the user equipment nodes.

As also shown in FIG. 1, one or more of the base station nodes 40 may actually act as a relay node for onward transmission of communications issued by an associated base station node 35, and indeed for relaying back to the base station node 35 signals transmitted by the items of end user equipment 60, 65.

The base station nodes 30, 35 of the wireless network are typically connected via a communications infrastructure 15 with an access services network gateway 10 to enable inbound communication to be forwarded to the items of end user equipment and for outbound communication to be routed to some other network via the access services network gateway 10. This requires each of the base station nodes 30, 35 to be provided with a backhaul connection to the communications infrastructure 15. Such a backhaul connection can be effected via a traditional wired backhaul connection, or alternatively via a wireless backhaul connection.

One or more network controllers 20 are provided to control the components of the wireless network (denoted schematically by the dotted box 25). Whilst the network controller can be provided with dedicated control connection paths in order to control the various components 25, in an alternative embodiment, it can communicate via the communications infrastructure 15 and the backhaul connections to the various base station nodes 30, 35 in order to route control messages to those base stations, and from there control messages can be issued to the items of end user equipment via the wireless links.

Each wireless link between a base station node and a user equipment (UE) node (in either the downlink communication path to the UE node or the uplink communication path from the UE node) can be formed of one or more wireless channels, with a separate channel being provided for each logical antenna in the transmitting node. This is shown schematically in FIG. 2A, where a transmitter node 100 communicates with a recipient node 105 via one or more wireless channels 110. For a downlink communication, the transmitter node will be one of the base station nodes 30, 35, 40, and the recipient node will be one of the UE nodes 45, 50, 55, 60, 65, whilst for an uplink communication, the transmitter node will be one of the UE nodes and the recipient node will be one of the base station nodes.

When the transmitter node 100 wishes to transmit some source data, it first needs to convert that source data into an information bearing signal using modulation control information. In one embodiment, this modulation control information takes the form of a coding and modulation scheme (MCS) defining how the source data should be encoded in order to generate code words, and further how those code words should then be modulated in order to generate modulated code words forming the information bearing signal. Further, to allow the recipient node 105 to estimate the effects of the channel on the transmitted data, a reference signal design will be used by the transmitter node in order to combine with the information bearing signal a number of pilot symbols which can then later be analysed by the recipient node in order to determine the channel effects at the predetermined locations at which those pilot symbols are added, and by extrapolation to then determine the channel effects at other locations containing the information bearing signal data.

As will be described in more detail later, in accordance with the described embodiments a modulation control and reference signal determination block 115 is used to determine both the modulation control information to be used to generate the information bearing signal from the source data, and a reference signal design to be used to determine the form of pilot symbols to be added into the transmitted signal (in particular the locations at which those pilot symbols are to be added, but also optionally additional information such as the transmit power to be used for those pilot symbols).

Figure 2A:
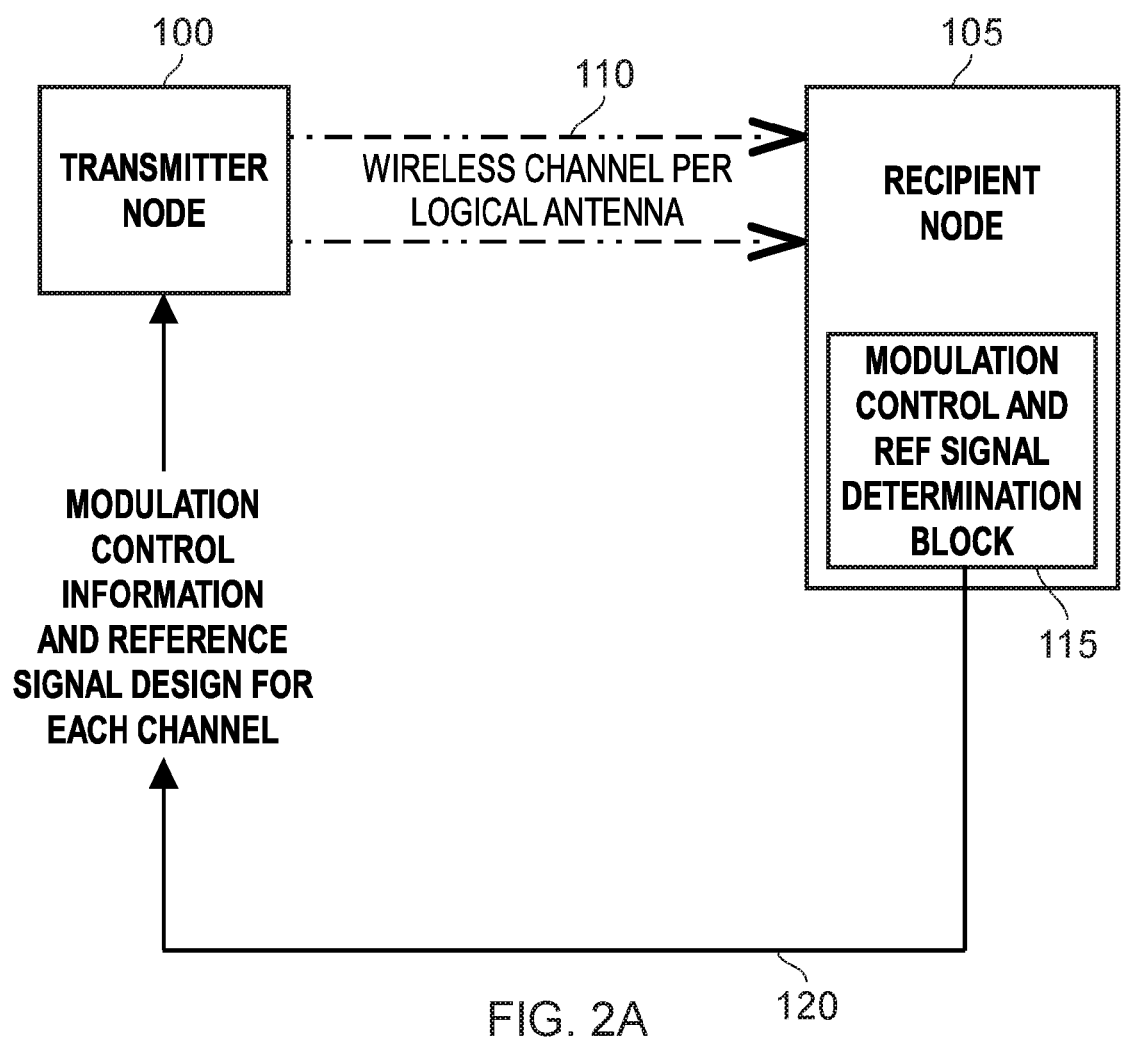
FIGS. 2A and 2B illustrate two alternative arrangements for provision of a modulation control and reference signal determination block in accordance with embodiments of the present invention.

In the example of FIG. 2A, the modulation control and reference signal determination block 115 is provided as part of the recipient node 105. However, in an alternative embodiment, as illustrated schematically in FIG. 2B, the modulation control and reference signal determination block 145 may instead be provided within the network controller 20. In accordance with this centralised embodiment, recipient nodes 130 will provide report data over path 135 to the network controller. This report data can be information about the pilot signals received during live communication over the one or more wireless channels 110, or alternatively can take the form of sounding data produced during a sounding process where a known sounding signal is transmitted to the recipient node 130, and the recipient node then provides the network controller 20 with an indication of the form in which that sounding signal is received. In one embodiment, the recipient node 130 will generate channel metrics from the sounding information, or indeed from the received pilot signals during normal operation, with that information being stored within the channel estimation database 140. One or more operations performed by the network controller itself can be used to supplement the channel estimation information stored in the channel estimation database, as will be discussed later with reference to FIG. 6.

Figure 2B:
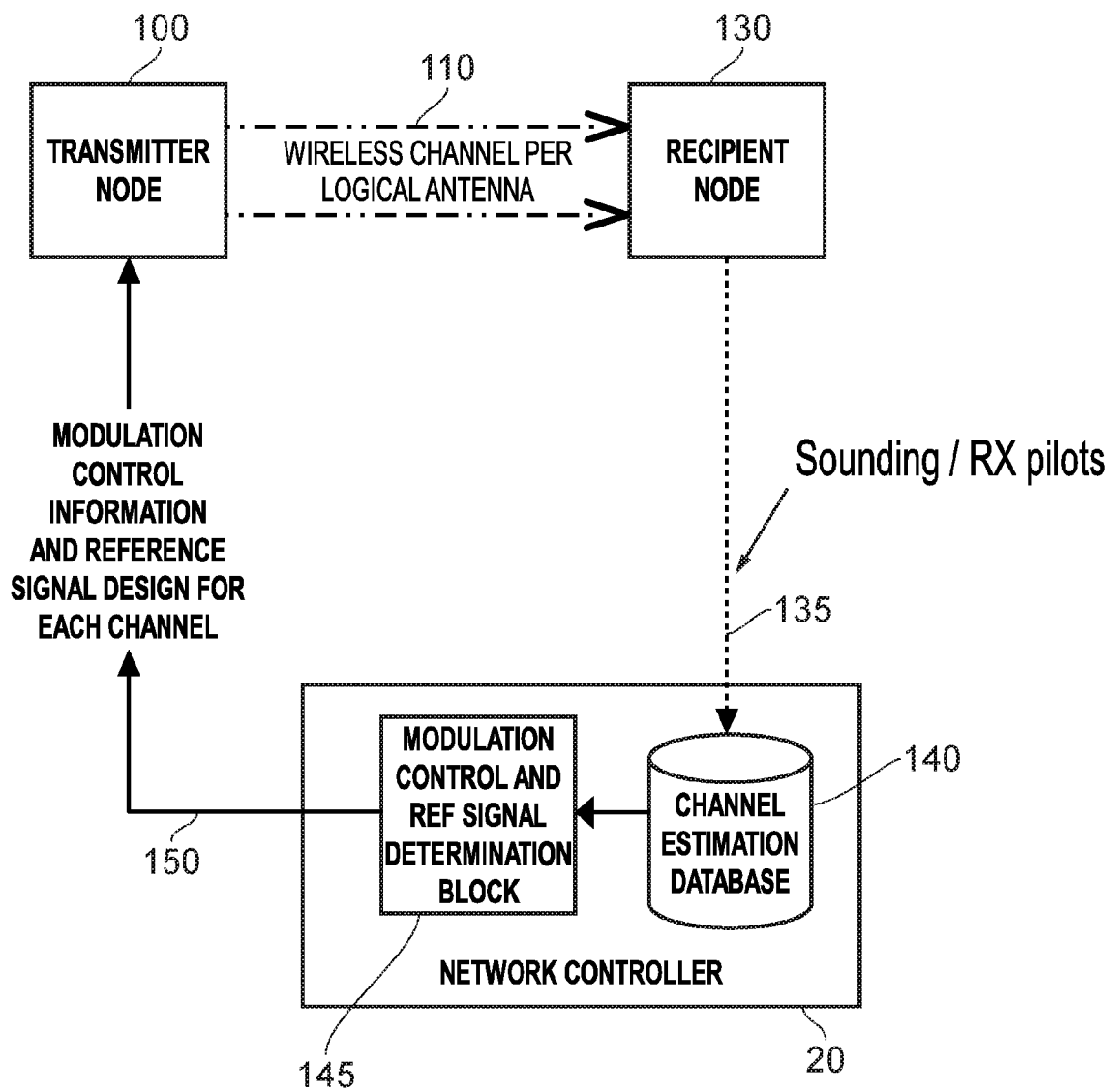

As and when desired, the network controller 20 can then perform an operation to generate modulation control information and a reference signal design to be used for each of the channels 110 between the transmitter node 100 and the recipient node 130. Irrespective of whether the configuration of FIG. 2A or the configuration of FIG. 2B is used, where multiple channels exist between a particular transmitter node and a particular recipient node, the modulation control and reference signal determination block will typically select a unique reference signal design for each such channel.

Figure 3A:
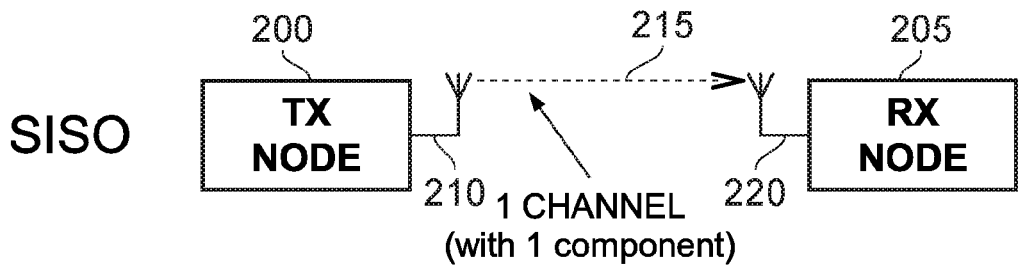
FIGS. 3A to 3D illustrate logical antenna and associated channel arrangements that can be used in accordance with various embodiments.

FIGS. 3A to 3D illustrate different configurations of wireless channels between the transmitter node 200 and a recipient node 205. In particular, FIG. 3A illustrates a single input single output (SISO) arrangement where the transmitter node 200 is provided with a single logical antenna 210 providing an associated channel 215 for communication with a receive antenna 220 at the recipient node 205 (in FIGS. 3A to 3D the receive antennas shown at the recipient node 205 are physical antennas). Since in this example there is only a single logical transmit antenna and a single receive antenna, the channel 215 only has a single component.

Figure 3B:
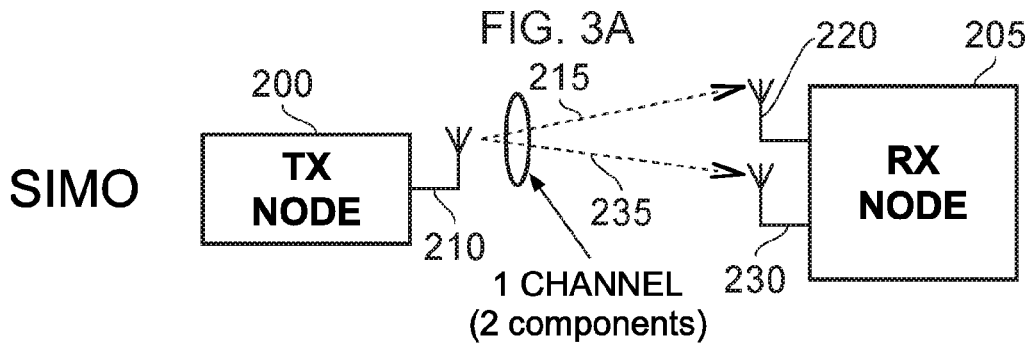

FIG. 3B illustrates a single input multiple output (SIMO) configuration where, as with FIG. 3A, the transmitter node 200 has a single logical transmit antenna 210. However, in this example, the recipient node 205 has two receive antennas 220, 230. Since there is only a single logical transmit antenna 210, there is again only a single channel, but in this example the channel is formed of two components 215 and 235.

Whilst a number of systems may employ the configurations of either FIG. 3A or 3B, an example would be a beamformer application, where the transmitter node 200 has a single logical antenna 210 (typically consisting of multiple physical antennas), to which a beamforming operation is applied in order to create the transmitted signal. In accordance with the techniques of the described embodiments, the modulation control and reference signal determination block 115, 145 will be used to determine the modulation control information to be used to generate the information bearing signal transmitted on the channel of FIG. 3A or FIG. 3B, along with the reference signal design used to generate the reference signal to be combined with that information bearing signal.

Figure 3C:
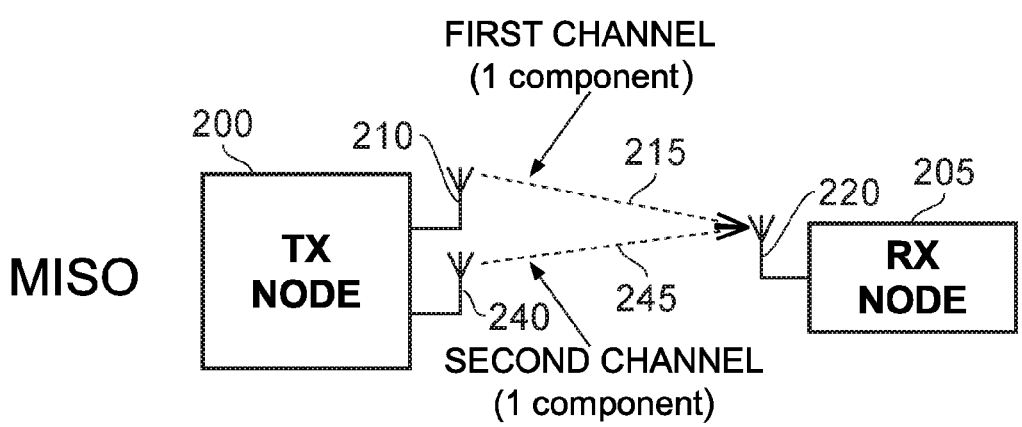

In accordance with FIG. 3C, a multiple input single output (MISO) arrangement is illustrated, where the transmitter node 200 has two logical antennas 210, 240, whilst the recipient node 205 has only a single receive antenna 220. Given the presence of the two logical transmit antennas 210, 240, such an arrangement will consist of two separate channels 215, 245, each having a single component. In accordance with the described embodiments, the modulation control and reference signal determination block 115, 145 will separately determine modulation control information and a reference signal design for each of the channels 215, 245 and typically a unique reference signal design will be used for each of the two channels. Such an arrangement may, for example, be used to implement a space/time coding configuration, also often referred to as a transmit diversity configuration. Such a configuration is used to provide redundancy, and typically separate physical antennas will be provided for each logical antenna.

Figure 3D:
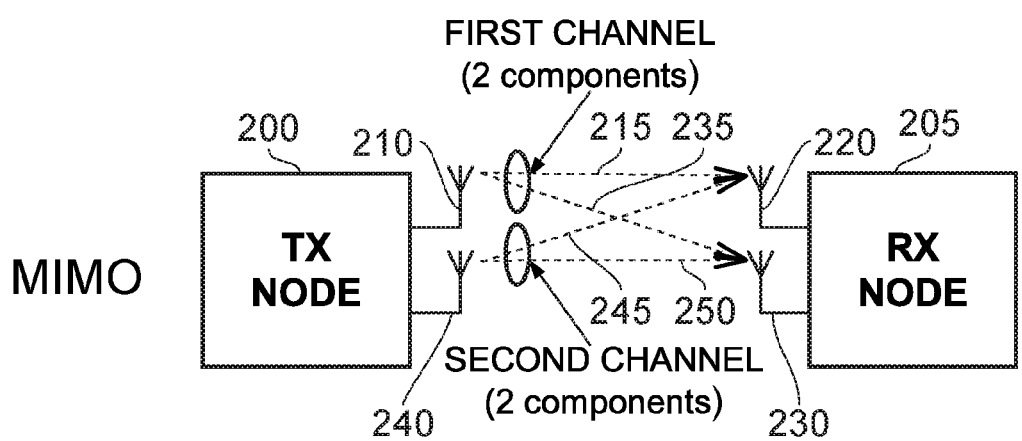

FIG. 3D illustrates a multiple input multiple output (MIMO) configuration where the transmitter node 200 has two logical transmit antennas 210, 240, and in addition the recipient node 205 has two receive antennas 220, 230. Given the two logical transmit antennas 210, 240, two separate channels will be provided, and due to the two receive antennas 220, 230, each of those channels will have two components. Accordingly, the first channel associated with the logical transmit antenna 210 will have the two components 215, 235, whilst the second channel associated with the logical transmit antenna 240 will have the two components 245, 250. As with the example of FIG. 3C, separate modulation control information and reference signal designs will be generated for each of the two channels.

Figure 4A:
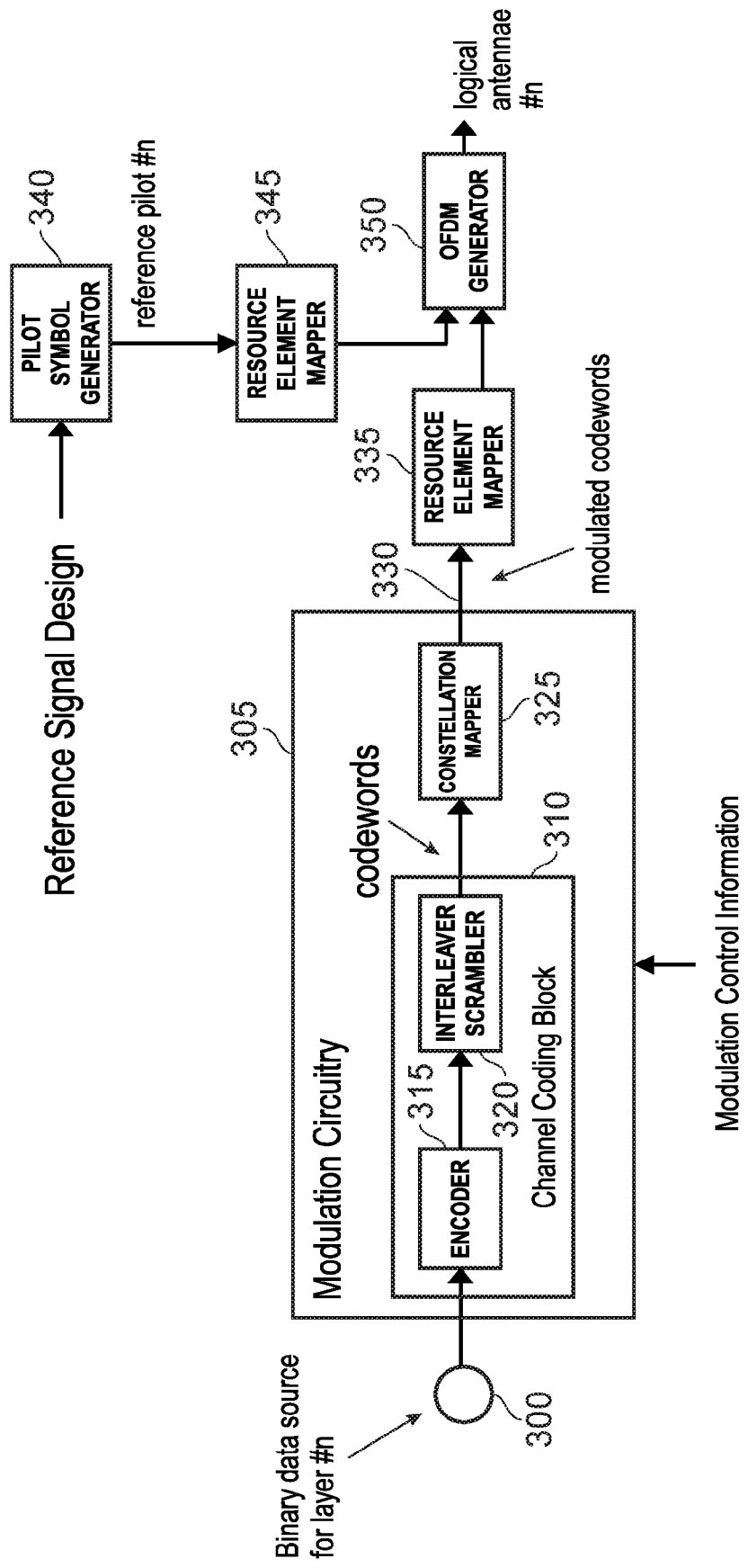
FIG. 4A is a block diagram illustrating components provided within a transmitter node in accordance with one embodiment.

FIG. 4A is a block diagram illustrating components provided within a transmitter node in accordance with one embodiment. As shown, source data 300 is input into modulation circuitry 305. The modulation circuitry receives the modulation control information output by the modulation control and reference signal determination block 115, 145 shown in FIGS. 2A and 2B. The part of that modulation control information specifying the coding to be performed is routed to the channel coding block 310 which comprises both an encoder 315 and an interleaver scrambler block 320. The encoder 315 performs temporal coding of the binary source data 300, whilst the interleaver/scrambler block scrambles and/or interleaves a coded bit stream output by the encoder 315 in order to generate an uncorrelated bit stream. The exact computations performed by the two blocks 315, 320 will depend on the coding information forming part of the modulation control information.

As a result of these operations, the channel coding block 310 outputs a series of code words to a constellation mapper block 325, the constellation mapper block 325 receiving that part of the modulation control information specifying the way in which the code words should be modulated, and using that information to generate a series of modulated code words output over path 330. In particular, the constellation mapper block 325 is used to generate a complex-valued modulation symbol (also referred to herein as a data symbol) from a group of consecutive scrambled bits. The stream of modulated code words 330 forms the information bearing signal to be transmitted from the logical antenna, and each of the modulated code words will comprise a series of data symbols.

The various data symbols contained within each modulated code word need to be allocated to resource elements within the wireless resource available for the transmit signal. In particular, a resource block will be allocated to the transmitter node, representing the minimum addressable quanta within the wireless spectrum (e.g. the frequency spectrum for a frequency modulated transmission). The resource block is broken down into a series of resource elements, each resource element having an associated sub-carrier within the frequency band of the resource block, and each data symbol will be allocated to one of those resource elements. In accordance with the example of the LTE Standard, a resource element is the smallest defined physical unit which consists of one OFDM sub-carrier during one OFDM symbol interval. The process of allocating data symbols to resource elements is performed by the resource element mapper 335.

Each modulated code word may also be referred to as a packet. Whilst there could in some implementations be more than one modulated code word transmitted in a resource block, in one embodiment there is a one to one relationship between a resource block and a modulated code word per transmit logical antenna (i.e. one modulated code word is transmitted in a resource block for each logical antenna).

The reference signal design generated by the modulation control and reference signal determination block 115, 145 is passed to the pilot symbol generator 340 which will generate a series of reference pilot symbols for combining with the information bearing signal in order to produce the transmit signal output by the logical antenna. Again, a resource element mapper 345 will be used to map the individual pilot symbols to associated resource elements.

The output from both the resource element mapper blocks 335, 345 is then routed to an OFDM generator 350 which generates a time domain OFDM signal for the associated logical antenna.

The arrangement of FIG. 4A can be used for conventional beamforming and cyclic delay diversity configurations, where there is only a single transmission layer. FIG. 4A also illustrates the components that would be provided in association with one of the transmission layers within a spatial multiplexing configuration where horizontal encoding is being performed.

Figure 4B:
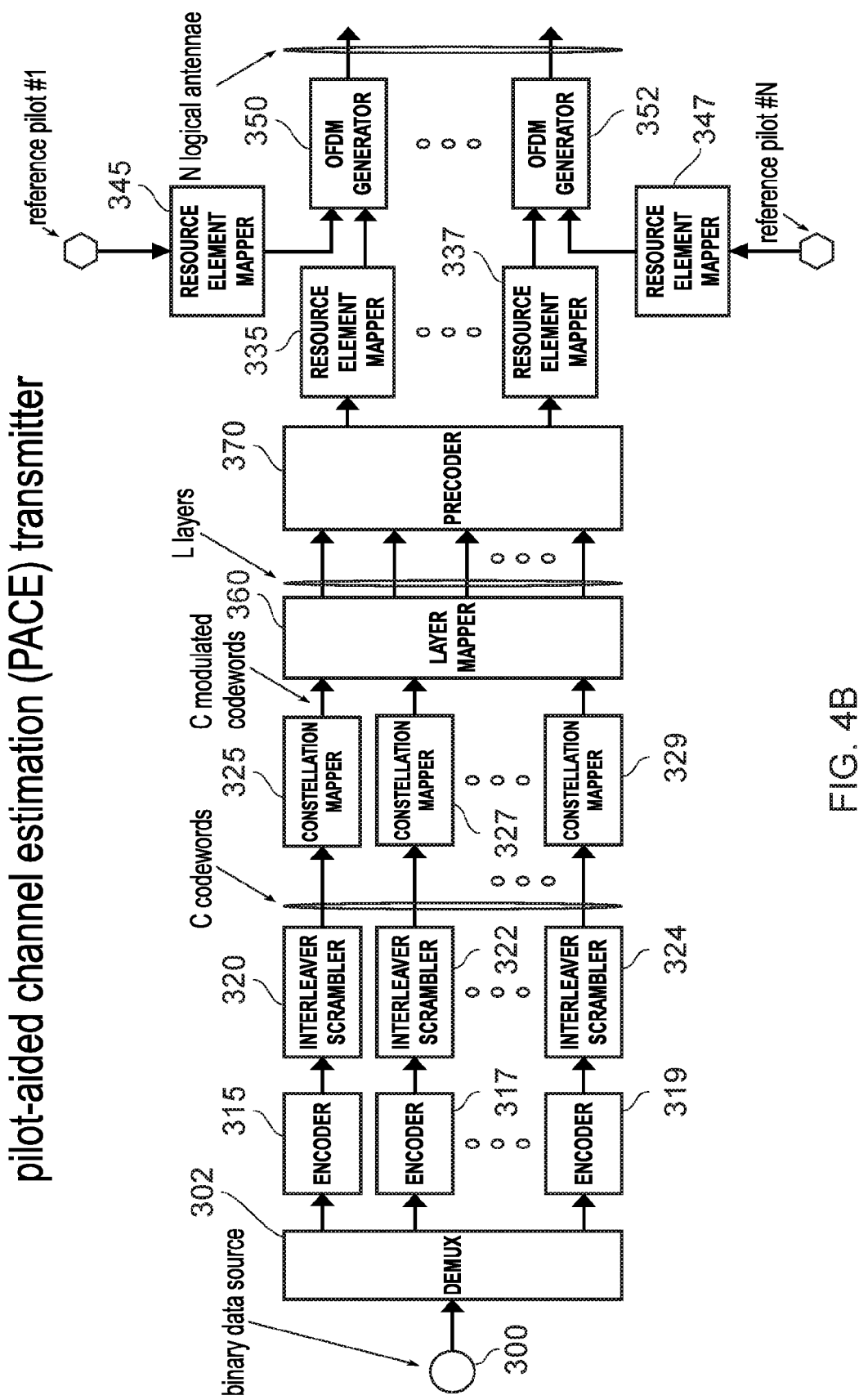
FIG. 4B is a block diagram illustrating components provided within a transmitter node in accordance with an alternative embodiment.

FIG. 4B illustrates a more generic configuration of the transmitter node, where C separate streams may be generated, which are then mapped to L transmission layers for transmission of a signal from N logical antennae. In this configuration, the source data 300 is routed to a demultiplexer 302, which demultiplexs the source data into C separate streams. Each stream is then subjected to modulation using modulation circuitry 305 such as described earlier with reference to FIG. 4A. Hence a first stream has an associated encoder 315, interleaver/scrambler 320 and constellation mapper 325, a second stream has an associated encoder 317, interleaver/scrambler 322 and constellation mapper 327, and so on, with the final stream having an associated encoder 319, interleaver/scrambler 324 and constellation mapper 329. As shown in FIG. 4B, C separate streams of code words are output from the interleaver/scrambler blocks, and similarly C streams of modulated code words are output by the constellation mapper blocks.

The layer mapper block 360 is used to map the complex-valued modulation symbols on to one or more transmission layers, with the output for each layer then being routed to the precoder 370. The precoder 370 performs spatial coding/beamforming of the complex-valued modulation symbols on each layer for transmission over the logical antennae, and hence produces a stream of data symbols for each of the logical antennae.

For each logical antennae, there will be provided a resource element mapper 335, 337 for mapping individual data symbols on to resource elements, and similarly there will be an associated resource element mapper 345, 347 for mapping on to resource elements the pilot symbols of the reference signal design allocated to the associated logical antenna. Further, a separate OFDM generator 350, 352 is then provided for generating the time domain OFDM signal for each logical antenna.

From FIG. 4B, it will be appreciated that a logical antenna is defined by the presence of a logical antenna specific reference signal. The logical antennae will be mapped to one or more physical antennae provided on the transmitter node, with the exact mapping from logical antennae to physical antennae being vendor specific. It should be noted that whilst the term logical antenna is a well-understood term in the art, certain Standards use a slightly different term. For example, the LTE Standard uses the term "antenna port" instead of "logical antenna".

With the configuration of FIG. 4B, all known multi-antenna transmission schemes are realisable. For example, for conventional (open and closed loop) beamforming, C will be equal to 1 and L will be equal to 1, i.e. there will be a single stream and a single layer (and also therefore a single logical antenna).

Similarly, for a cyclic delay diversity configuration, C will again be equal to 1 and L will be equal to 1. With a transmit diversity (also referred to as a space/time coding) configuration, the values of C and L can be varied as desired. Finally, for a spatial multiplexing configuration, if horizontal encoding is performed, the value of C will be equal to the value of L, if vertical encoding is performed, C will be equal to 1, and L will be greater than 1, and for diagonal encoding (either open or closed loop), the value of L will be equal to the value of N.

Figure 5:
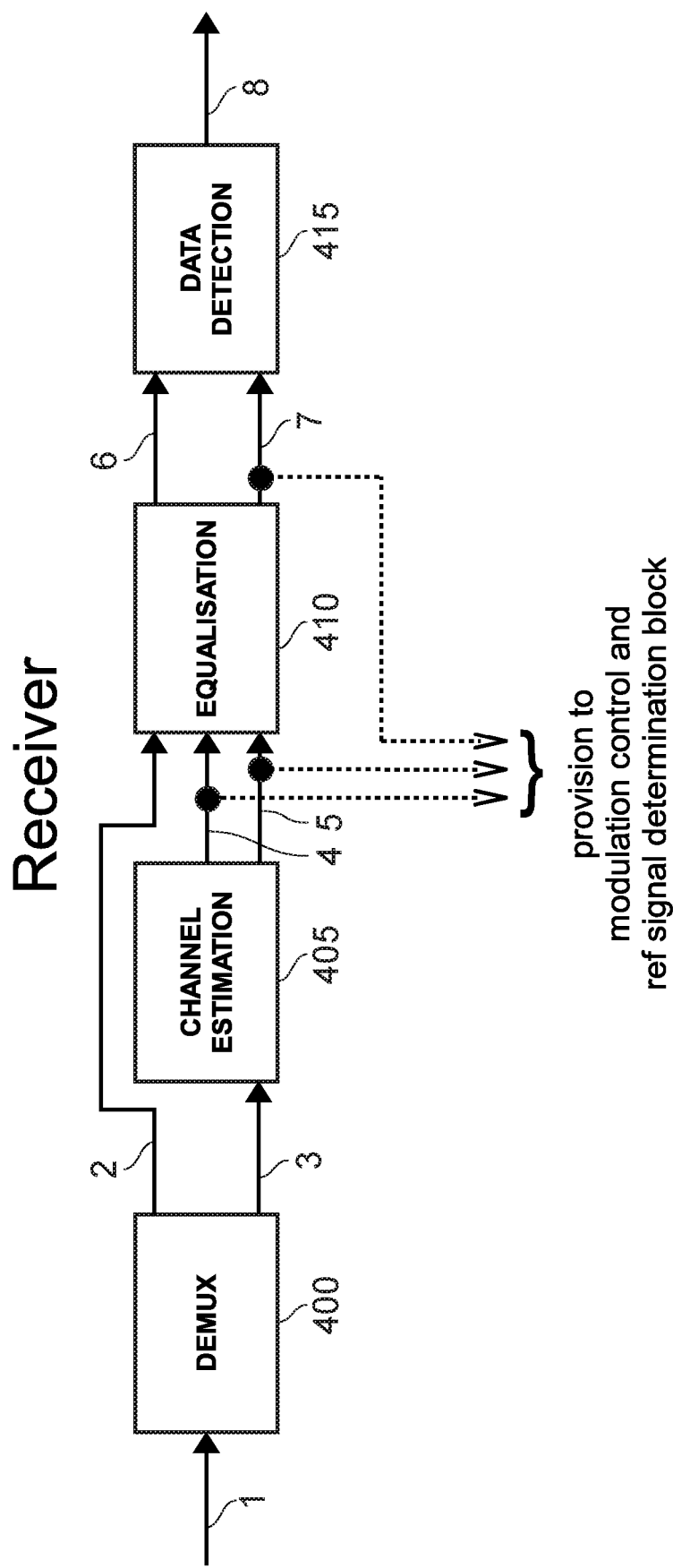
FIG. 5 is a block diagram illustrating components provided within a recipient node in accordance with one embodiment.

FIG. 5 is a block diagram illustrating components provided within a recipient node. The received signal 1 is input to the demultiplexer 400, which separates the input stream into its constituent pilot and data streams. The pilot signal stream is fed over path 3 into the channel estimation block 405, which produces a channel estimate over path 4, and a noise and interference estimate over path 5, both of which are output to the equalisation block 410. The channel estimate and noise and interference estimates are computed on a per-sub-carrier basis.

The received data stream routed over path 2 is then equalised in the channel equalisation block 410 using the channel estimate and noise and interference estimate output by the channel estimation block. The output of the equaliser block 410 comprises two estimates, namely a stream of modulated data symbols output over path 6, and an estimated signal to interference plus noise (SINR) estimate for the modulated data symbols output over path 7.

The data detection block 415 then uses these two inputs in order to generate the decoded bits forming the received data, which is output over path 8. In general terms, the operation of the data detection block 415 is to perform a reverse modulation and decode operation on the equalised data symbols output over path 6. The actual computation performed by the data detection block 415 will depend on the modulation used by the transmitter to generate the information bearing signal transmitted from the transmitter. However, by way of example, if the data was modulated using the quadrature amplitude modulation (QAM) technique, the data detection block 415 will compute the a-priori log-likelihood ratios of the transmitted code word and will then proceed to compute the a-posteriori log-likelihood ratios of the message bits, using for example a Turbo decoder if the message bits were encoded at the transmitter using Turbo codes.

As shown in FIG. 5, in accordance with the described embodiments, the channel estimate signal 4, noise and interference estimate signal 5 and the signal to interference plus noise estimate 7 can additionally be routed to the modulation control and reference signal determination block 115, 145 for use when determining the modulation control information and reference signal design to be used for a specific wireless channel of communication between a transmitter node and that recipient node.

Figure 6:
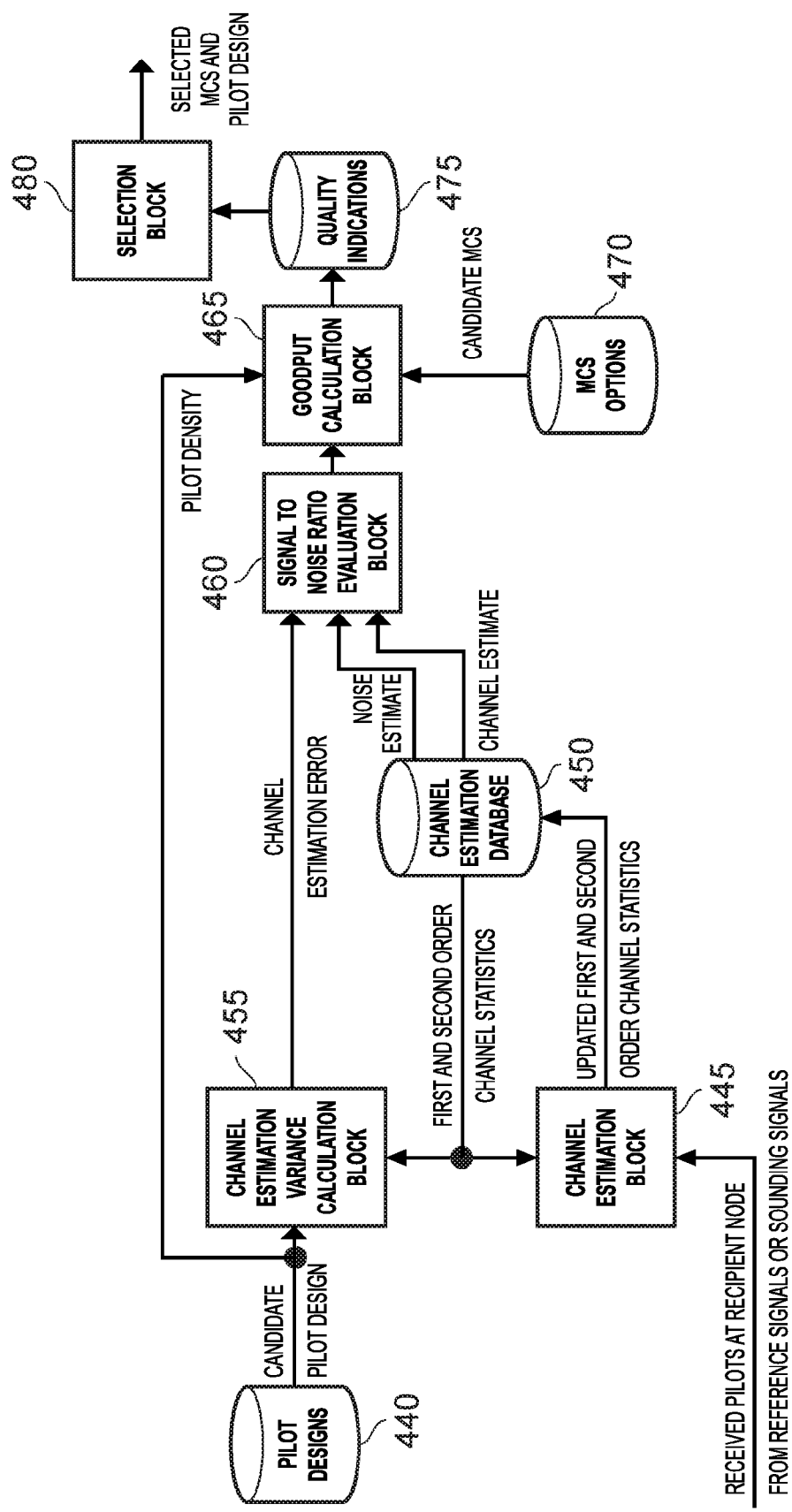
FIG. 6 is a block diagram illustrating components provided within the modulation control and reference signal determination block in accordance with one embodiment.

FIG. 6 is a block diagram illustrating components provided within the modulation control and reference signal determination block 115, 145 in accordance with one embodiment. Firstly, a channel estimation block 445 is provided for receiving the pilot signals detected by a recipient node from reference signals transmitted during live communication, or from sounding signals, and for computing channel estimate information to store within a channel estimation database 450. As discussed earlier with reference to FIG. 5, this channel estimation block may at least partly be provided within one or more of the recipient nodes, but in an alternative embodiment can be provided centrally within the modulation control and reference signal determination block to perform the channel estimation process.

Figure 7A:
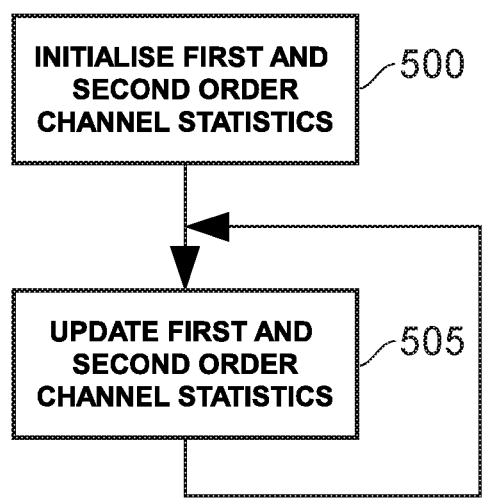
FIG. 7A is a flow diagram illustrating the generation and maintenance of first and second order channel statistics in accordance with one embodiment.

FIG. 7A is a flow diagram schematically illustrating the generation and maintenance of first and second order channel statistics in accordance with one embodiment, this process being performed by the channel estimation block 445. At step 500, the first and second order channel statistics are initialised within the channel estimation database 450. As each new set of pilots is received by the channel estimation block, the channel estimation block can read the current first and second order channel statistics from the channel estimation database 450, and then produce updated first and second order channel statistics based on the newly received pilot information, with that updated first and second order channel statistic information being stored within the channel estimation database 450. This update process is performed at step 505 of FIG. 7A, and is repeated as shown for each newly received set of pilot information. Examples of the first and second order channel statistics that may be calculated will be discussed in more detail later, but in one embodiment the first order channel statistics will comprise a channel estimate formed of either a channel impulse response or a channel frequency response. Further, the second order channel statistics may include channel estimate covariance matrices and noise and interference covariance matrices.

Figure 7B:
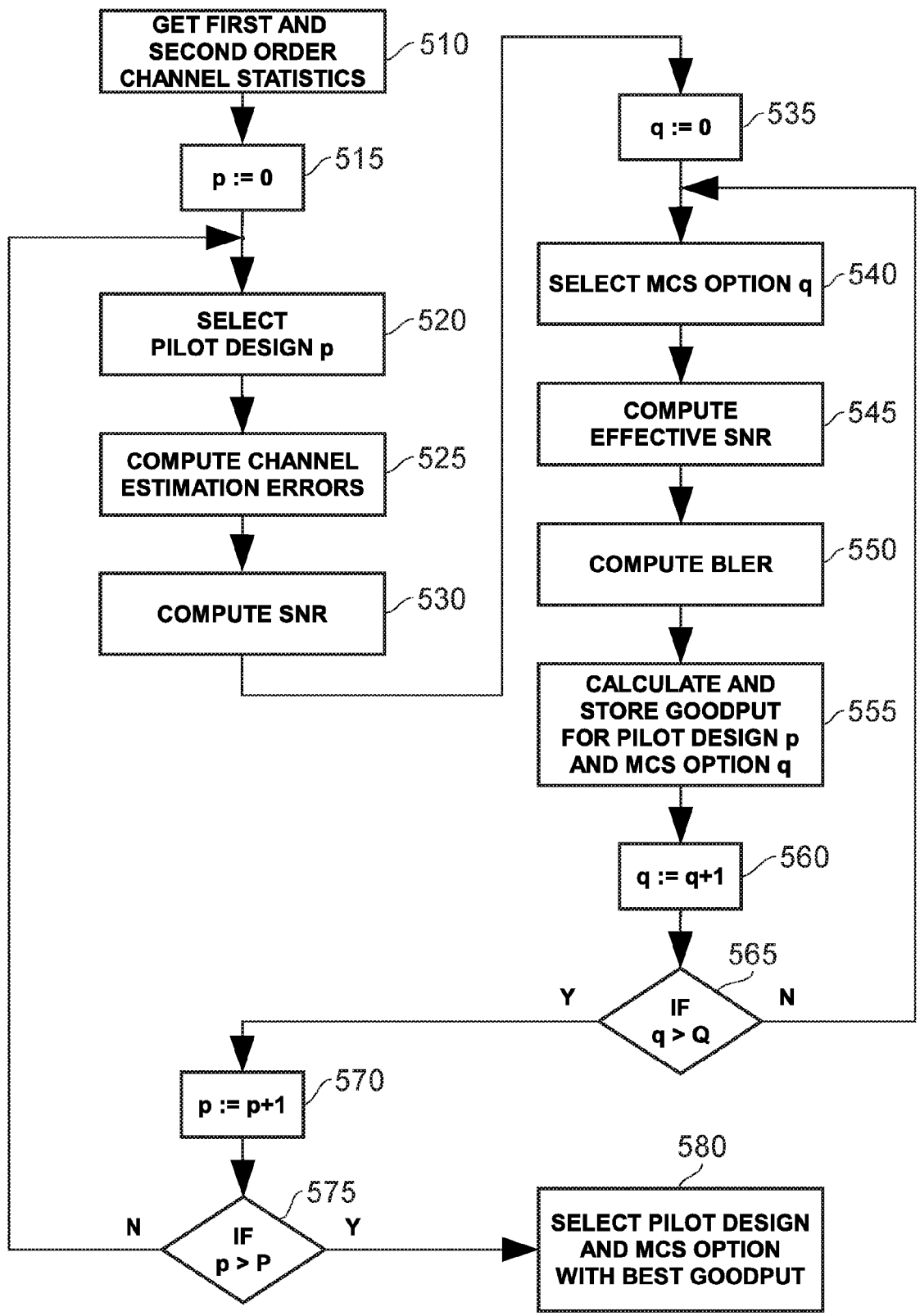
FIG. 7B is a flow diagram illustrating a method performed by the circuitry of FIG. 6 in one embodiment in order to determine a pilot design and modulation control option providing best throughput.

When it is required to identify a pilot design and modulation control information (also referred to herein as an MCS option) for a particular wireless channel associated with a logical transmit antenna, then the process of FIG. 7B can be performed by the circuitry of FIG. 6, as will be now discussed in more detail. In particular, the first and second order channel statistics currently stored within the channel estimation database 450 are provided to the channel estimation variance calculation block 455 at step 510. As shown in FIG. 6, the channel estimation variance calculation block 455 also has access to a storage 440 containing a set of candidate pilot designs. At step 515, a parameter p is set equal to 0, and then at step 520 the pilot design p is read from the pilot design storage 440. Thereafter, the channel estimation variance calculation block 455 is arranged at step 525 to compute channel estimation errors based on the currently selected pilot design and the first and second order channel statistics provided from the channel estimation database 450. In one embodiment, it has been found that this computation can be performed without requiring the first order channel statistics, and in particular the error covariance matrices do not depend on channel realisations. Instead, it has been found that the channel estimate covariance, i.e. channel estimation error, can be calculated as function of the selected pilot design observation matrices (identifying the location and transmit power of the pilot symbols to be added in accordance with the chosen pilot design) and based on knowledge of certain second order channel statistics.

The channel estimation error produced by the channel estimation variance calculation block 455, along with the channel estimate and noise estimate obtained from the channel estimation database 450, collectively form channel state information (CSI) for the channel of interest, this channel state information being provided to the signal to noise ratio evaluation block 460. In one embodiment, the channel estimate takes the form of the first order channel statistic, in particular, a channel impulse response or a channel frequency response, whilst the noise estimate takes the form of a measurement noise covariance matrix R[k]. The signal to noise ratio information generated by the signal to noise ratio evaluation block will typically comprise of a vector of separate signal to noise information for each sub-carrier at a particular time symbol, i.e. for each resource element within the resource block. This vector of signal to noise ratio information is then provided to the goodput calculation block 465, which is also arranged to receive the pilot density information for the selected candidate pilot design, and is arranged to have access to a storage 470 comprising a set of MCS options.

Figure 8:
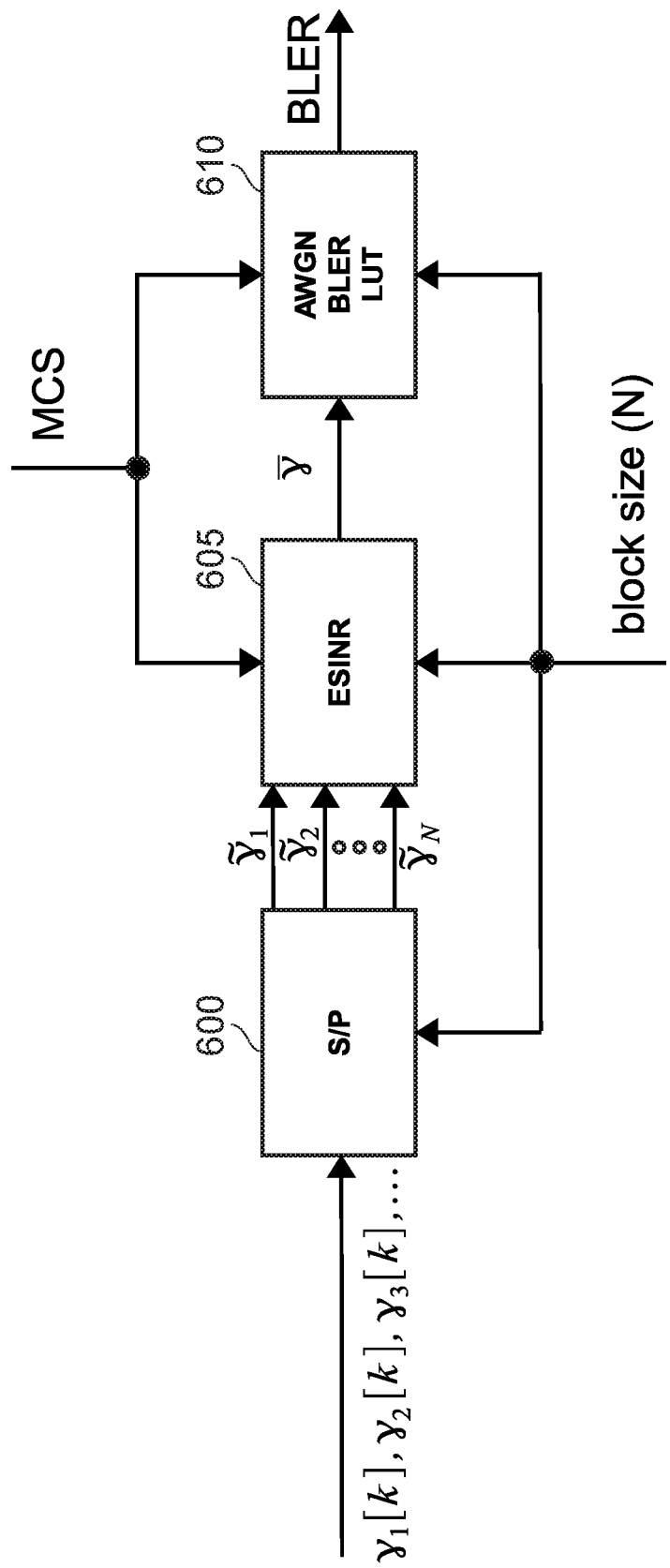
FIG. 8 is a block diagram illustrating a block error rate predictor circuit that can be used in one embodiment to compute the effective signal-to-noise ratio and block error rate when performing the method of FIG. 7B.

Following the computation of the signal to noise ratio at step 530, at step 535 a parameter q is set equal to 0, and then at step 540 the goodput calculation block 465 will select the MCS option q from the storage 470. The goodput calculation block 465 then performs a series of steps 545, 550 and 555 in order to calculate and store a goodput for the pilot design p and the MCS option q. In one embodiment, steps 545 and 550 can be performed by the block error rate predictor circuitry illustrated in FIG. 8. In FIG. 8, the SINR for sub-carrier n is denoted by the symbol $\gamma_n$, and these series of sub-carrier specific SINR values are input to the S/P block 600. The SINR values of the data sub-carriers are rearranged into blocks of length N by the S/P block 600 (the block size N hence encapsulating a number of data symbols, for example, four data symbols, eight data symbols, etc). Each block of SINR values is input to the ESINR block 605 which, based on the specified block size and the current MCS option, produces a scalar value $\bar{\gamma}$. Based on that scalar value, the currently considered MCS option and the block size, the BLER computation block 610 generates a block error rate (BLER) prediction using a pre-computed family of BLER versus SINR curves as available from a lookup table (LUT). The BLER curves are generated under frequency non-selective (AWGN) fading conditions.

Accordingly, it can be seen that the circuitry of FIG. 8 computes both the effective SNR at step 545 and then computes the BLER at step 550.

At step 555, the goodput is then calculated by the following equation:

(1−BLER)×(1−pilot density)×(MCS spectral efficiency)

That goodput value is then stored within the quality indications storage 475.

At step 560, the value of q is incremented by 1, whereafter at step 565 it is determined whether q is now greater than some predetermined maximum value Q (thereby indicating that all MCS options have been considered). If not, the process returns to step 540, in order to repeat steps 540, 545, 550, 555 for the next MCS option. However, once all MCS options are determined to have been considered at step 565, the process proceeds to step 570, where p is incremented by 1, and it is then determined at step 575 whether p is now greater than a predetermined maximum value P, indicating that all pilot designs have been considered. If not, the process returns to step 520. However, once all pilot designs have been considered, then the process proceeds to step 580.

At this point, the quality indication storage 475 will identify a goodput value for every combination of candidate pilot design and MCS option. The selection block 480 is then arranged at step 580 to select as the winning quality indication that goodput value that is the highest from amongst all of the goodput values stored within the quality indication storage 475. For the selected goodput value, the associated MCS and pilot design are then chosen as the modulation control information and reference signal design to be routed to the relevant transmitter for subsequent use when generating signals to output over the wireless channel.

An individual transmitter node may have one or more logical antennae, and each logical antenna will have an associated channel. Furthermore, there will typically be multiple transmitting nodes within the wireless network. In such embodiments, the above process of FIG. 7B can be repeated for every channel within the wireless network in order to allocate modulation control information and a reference signal design for each channel. Whilst in one embodiment this process may be performed sequentially for each channel, it can alternatively be performed at least partly in parallel for each of the channels within the wireless network.

In one embodiment, the above described method of FIG. 7B can be re-performed whenever desired, for example on occurrence of one or more trigger conditions. There are a variety of trigger conditions that may be used to cause the method to be re-performed in order to re-evaluate the appropriate combination of candidate reference signal design and candidate modulation control information to be used for any particular channel. For example, whenever a global sounding process is performed, then this may be used as a trigger to re-perform the above described process of FIG. 7B for each channel within the wireless network. Similarly if a global event causes a change in the arrangement of the channels within the wireless network (for example a switch from spatial multiplexing to transmit diversity within a MIMO system), then the process of FIG. 7B can be re-performed. Additionally, certain local events may be used to re-perform the process for one or more particular channels within the wireless network. For example, individual recipient units may be arranged to provide information indicating when the channel conditions have changed (for example via HARQ reporting), and such information may be used to re-trigger the performance of the above process for one or more specified channels.

The described method of FIG. 7B in effect populates a two dimensional throughput table, where rows are the MCS options and columns are the pilot density options. An example throughput table (measured in Mbps), is shown in Table 1 below:

TABLE 1

| MCS Option\ Pilot Density | very low | low | normal | high | very high |
| --- | --- | --- | --- | --- | --- |
| 1 | 8.2 | 8.1 | 8.0 | 7.8 | 7.5 |
| 2 | 12.3 | 12.2 | 12.0 | 11.8 | 11.3 |
| 3 | 16.2 | 16.3 | 16.0 | 15.7 | 15.1 |
| 4 | 21.5 | 22.1 | 23.8 | 23.5 | 22.6 |
| 5 | 20.5 | 21.4 | 22.2 | 23.3 | 22.6 |
| 6 | 23.5 | 25.7 | 27.2 | 27.4 | 26.9 |
| 7 | 24.5 | 27.9 | 28.8 | 30.0 | 29.6 |
| 8 | 17.3 | 26.9 | 30.7 | 30.9 | 31.2 |
| 9 | 5.3 | 13.3 | 18.7 | 24.8 | 30.8 |
| 10 | 0.0 | 7.9 | 15.9 | 19.4 | 25.3 |
| 11 | 0.0 | 0.0 | 0.0 | 3.1 | 11.7 |
| 12 | 0.0 | 0.0 | 0.0 | 0.0 | 2.3 |

Note MCS option 1 (QPSK modulation with rate ½) offers reduced throughput as the pilot density is increased. On the other hand, for MCS option 4 (16QAM modulation with rate ¾), we notice that the throughput peaks for normal pilot density and reduces for very low or very high pilot densities. In total 12×5 throughput computations are carried out to populate the table above, where 12 is the number of MCS options and 5 is the pilot density options.

An alternative, improved method for computing the MCS and pilot design, yielding the highest throughput with fewer populated entries in the throughput table involves firstly computing the throughput for all MCS options for the highest pilot density. Then for each reduced pilot density design, the throughput is computed for an MCS option until a point is reached where the throughput of that MCS option no longer increases as the pilot density decreases. This improved method yields the following throughput table shown in Table 2, were the Xs in the table indicate which of the throughput calculation need not take place:

TABLE 2

| MCS Option\ Pilot Density | very low | low | normal | high | very high |
| --- | --- | --- | --- | --- | --- |
| 1 | 8.2 | 8.1 | 8.0 | 7.8 | 7.5 |
| 2 | 12.3 | 12.2 | 12.0 | 11.8 | 11.3 |
| 3 | 16.2 | 16.3 | 16.0 | 15.7 | 15.1 |
| 4 | X | 22.1 | 23.8 | 23.5 | 22.6 |
| 5 | X | X | 22.2 | 23.3 | 22.6 |
| 6 | X | X | 27.2 | 27.4 | 26.9 |
| 7 | X | X | 28.8 | 30.0 | 29.6 |
| 8 | X | X | X | 30.9 | 31.2 |
| 9 | X | X | X | 24.8 | 30.8 |
| 10 | X | X | X | 19.4 | 25.3 |
| 11 | X | X | X | 3.1 | 11.7 |
| 12 | X | X | X | 0.0 | 2.3 |

For example, the throughput of the MCS option 8 is calculated for the highest pilot density first, yielding 31.2 Mbps. The throughput is then calculated using the "high pilot density" design to yield 30.9 Mbps. Since 30.9 is less than 31.2 there is no need to compute the throughputs for any other lower pilot density design for MCS option 8.

Such an approach as illustrated in Table 2 may be useful in situations where only one property of the pilot design is being altered between the various candidate pilot designs, such as where pilot density is changed as per the above example, or where instead transmit strengths of the pilots signals are altered. However, where combinations of properties are adjusted between different candidate pilot designs, such an approach may not be appropriate and instead it may be appropriate to evaluate all possible combinations of MCS option and pilot design.

Figure 9:
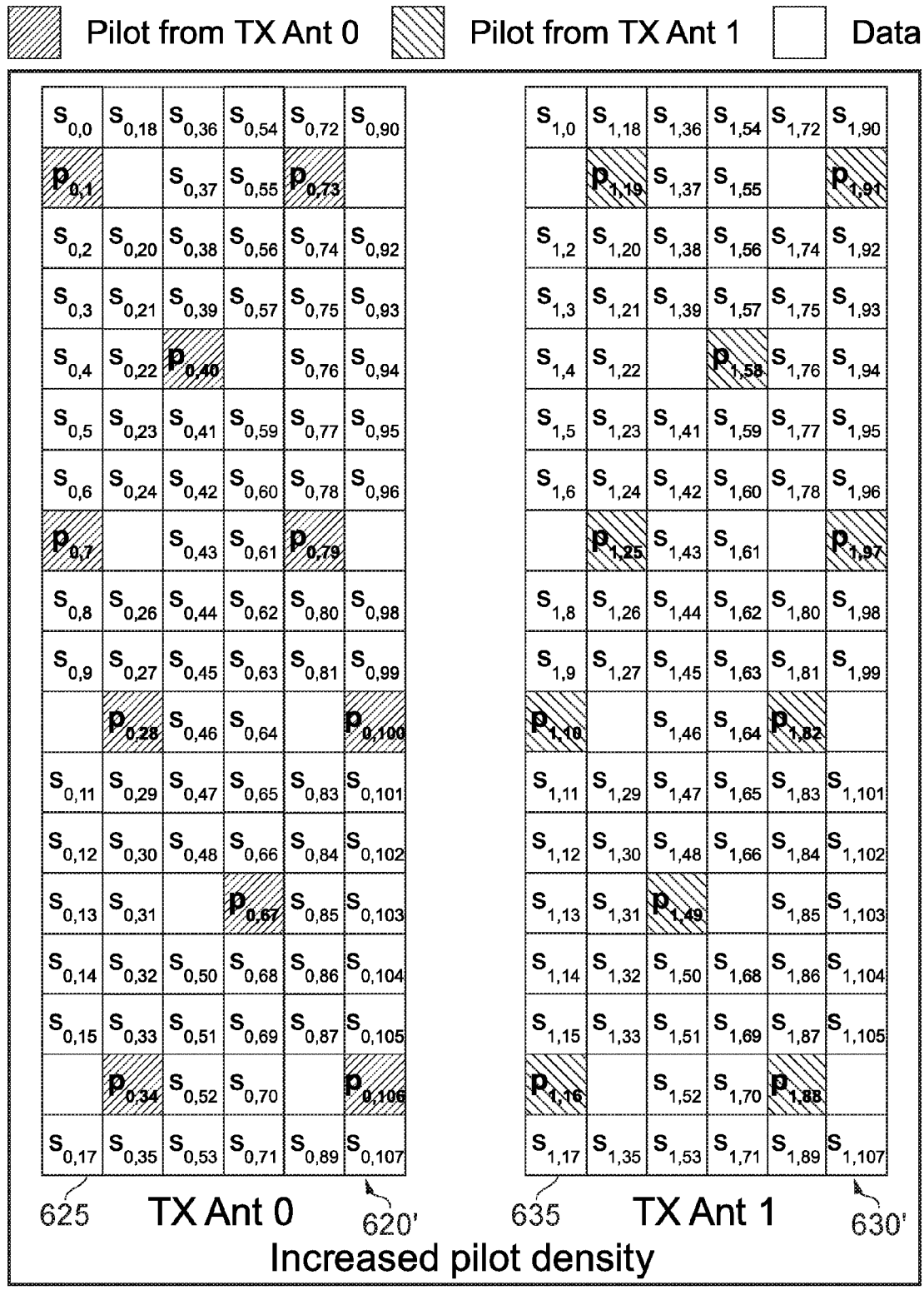
Figure 9:
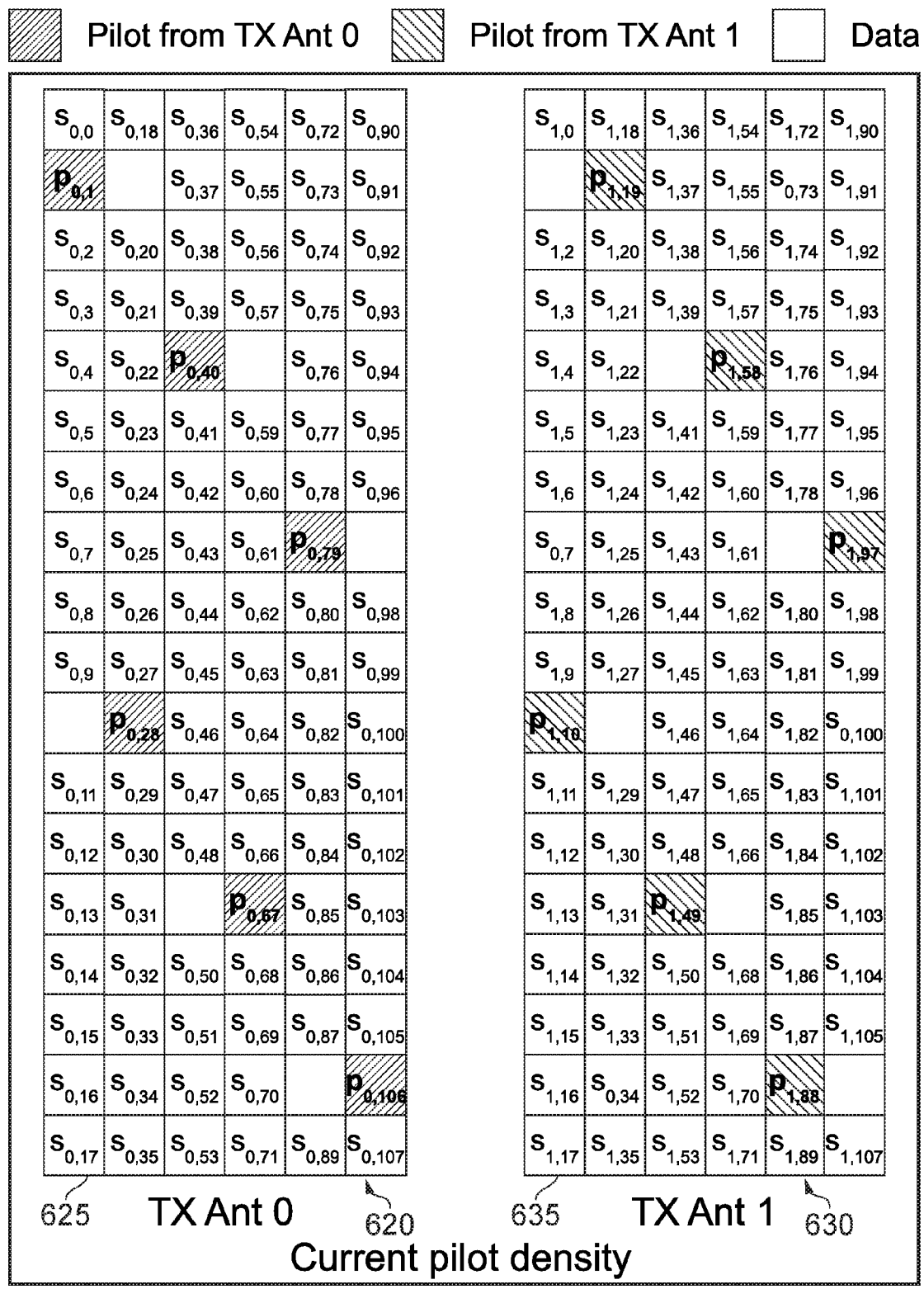

FIG. 9 schematically illustrates transmitted data and pilot sub-carriers within separate resource blocks allocated for two logical transmit antennas. In particular, a first resource block 620 is allocated to a first logical antenna and a second resource block 630 is allocated to a second logical antenna. The middle section of FIG. 9 shows an assumed current pilot density. Each column illustrates how a series of sub-carriers are used at any particular point in time. Hence, in this example 18 sub-carriers are used in each timeslot, and a resource block is formed by those 18 sub-carriers used over six time slots. Each sub-carrier is associated with a resource element, such as resource element 625 shown in association with the first resource block 620 or resource element 635 shown in association with the second resource block 630.

Hence, considering the first column representing time 0, the transmit antenna 0 transmits a pilot symbol in the second resource element, with all of the other resource elements carrying data symbols (referred to in FIG. 9 by the "s" symbol) except for resource element position 11, which carries no data. Conversely, at time 0 the logical transmit antenna 1 transmits no data in the second resource element position, and transmits a pilot in the $11^{th}$ resource element position. As a result, it will be appreciated that the transmission from the transmit antenna 0 will not cause any interference with the pilot symbol transmitted by the transmit antenna 1 in resource element position 11, and similarly the transmission from the transmit antenna 1 will not produce any interference with the pilot symbol transmitted at resource element position 2 from the transmit antenna 0.

As also shown in FIG. 9, six separate timeslots are used to form the resource block, whereafter transmission will return back to the first timeslot.

In accordance with the earlier described approach of FIGS. 6 and 7, it will be appreciated that, whilst a current pilot density design shown in the middle of FIG. 9 may be being used, various other alternative hypotheses can be considered by the process of FIG. 7B. FIG. 9 shows two alternative hypotheses, one based on an increased pilot density (see resource blocks 620' and 630') and one based on a reduced pilot density (see resource blocks 620" and 630"). The increased pilot density design and reduced pilot density design will form two of the candidate pilot designs stored within the pilot design storage 440, as indeed will the current pilot density design shown in the middle section of FIG. 9. Whilst FIG. 9 schematically illustrates alternative designs which increase or decrease the number of pilot symbols, it will be appreciated that other candidate pilot designs may consider increasing the power of pilot symbols, whilst other candidate pilot designs may consider decreasing the power of pilot symbols. Further candidate pilot designs may consider any combination of changes in location, changes in density, and/or changes in transmit power of pilots.

Figure 10:
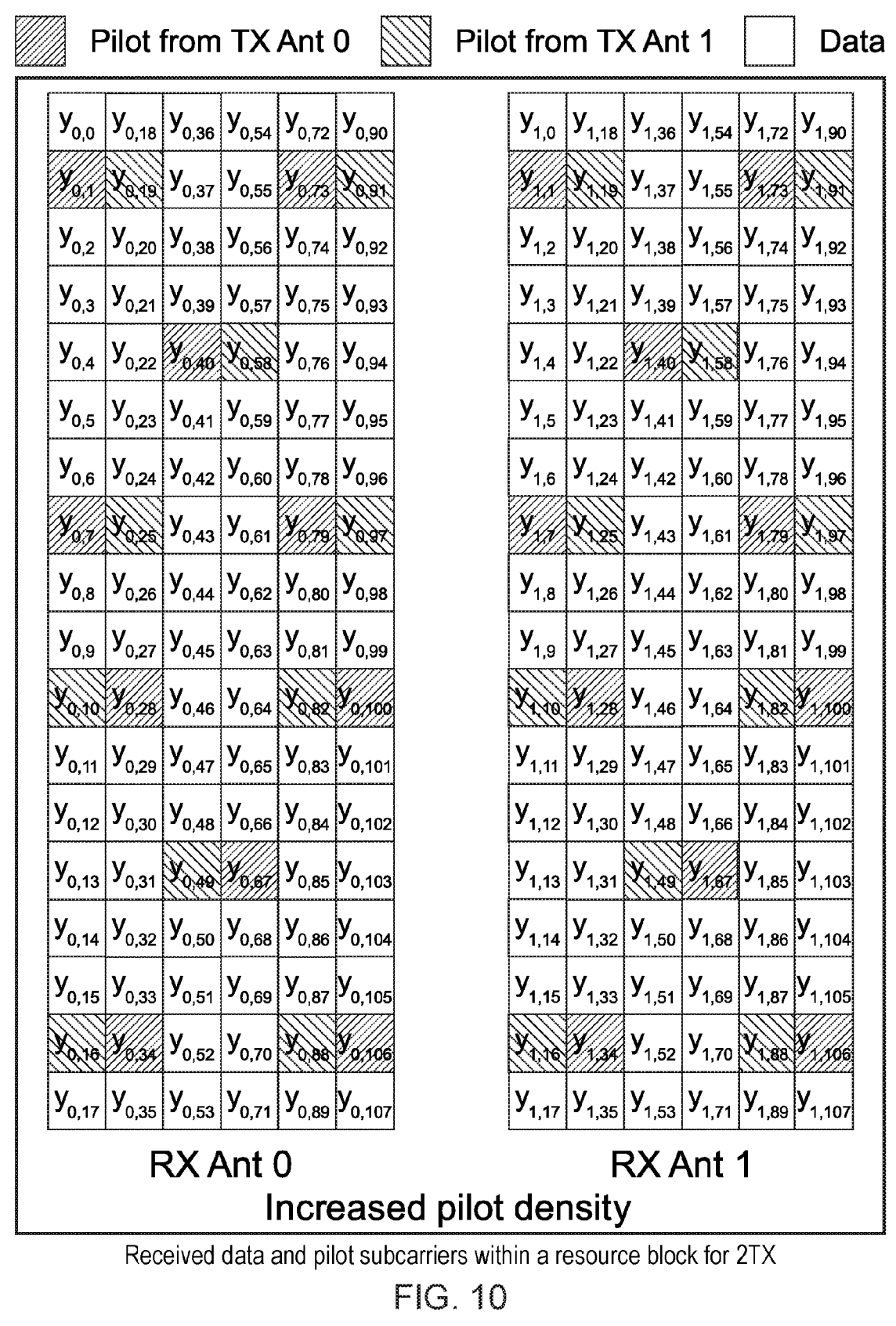
Figure 10:
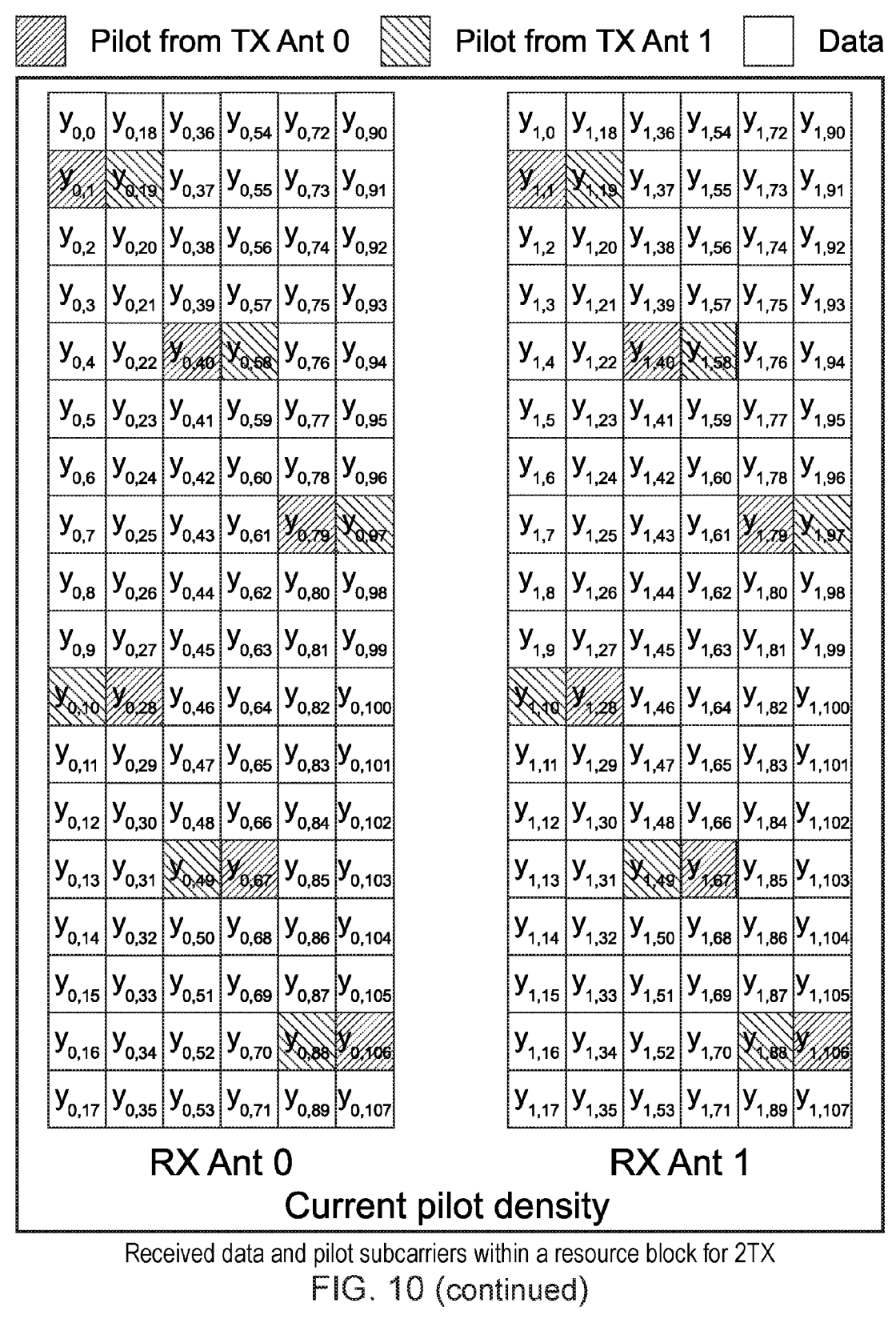
Figure 10:
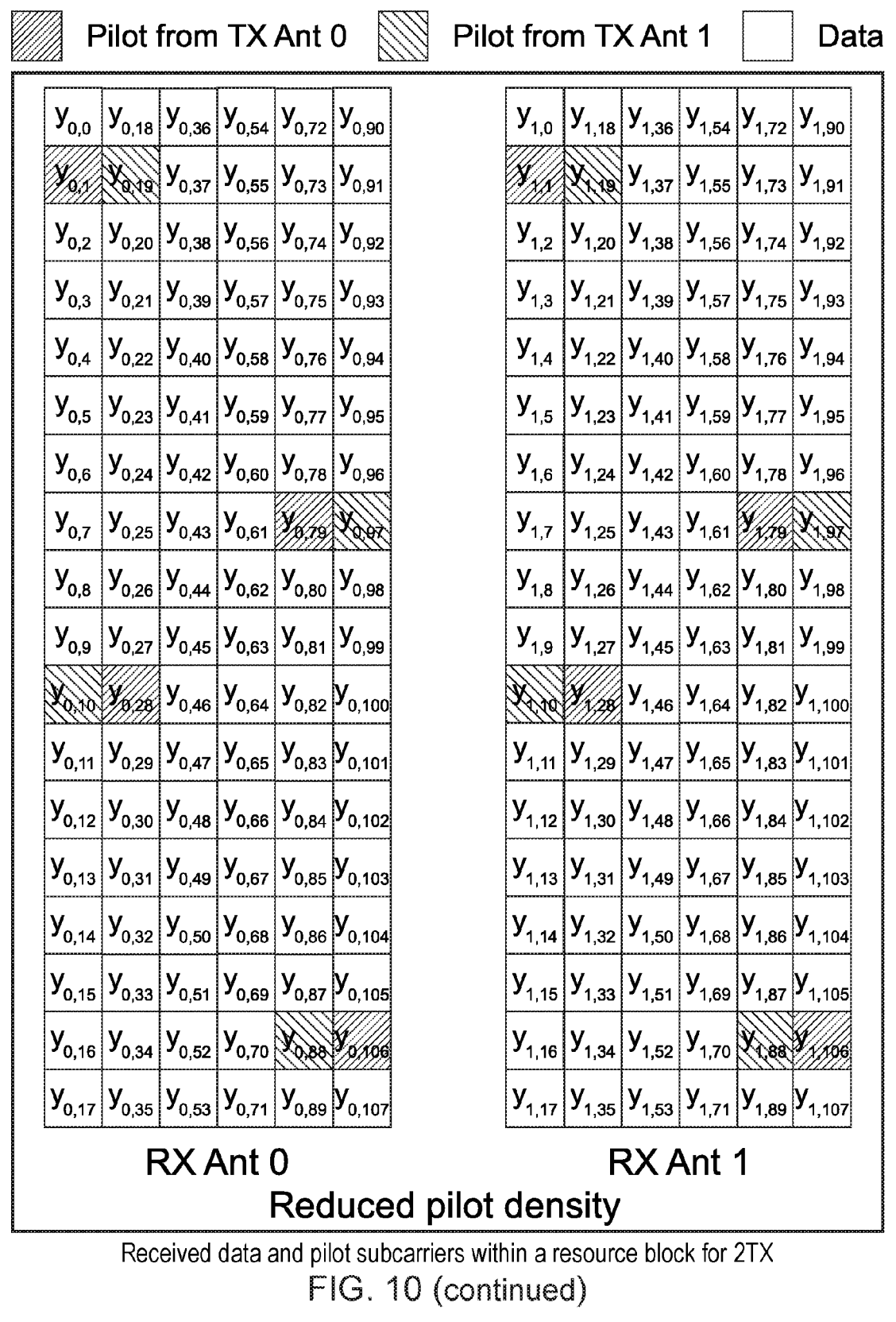

FIG. 10 is a figure illustrating the received data at two receive antennas based on the pilot designs shown in FIG. 9. The locations of the pilot symbols within each of the resource blocks are shown, and as is clear each receive antenna will receive the transmission from both of the two logical transmit antennas.

Figure 11:
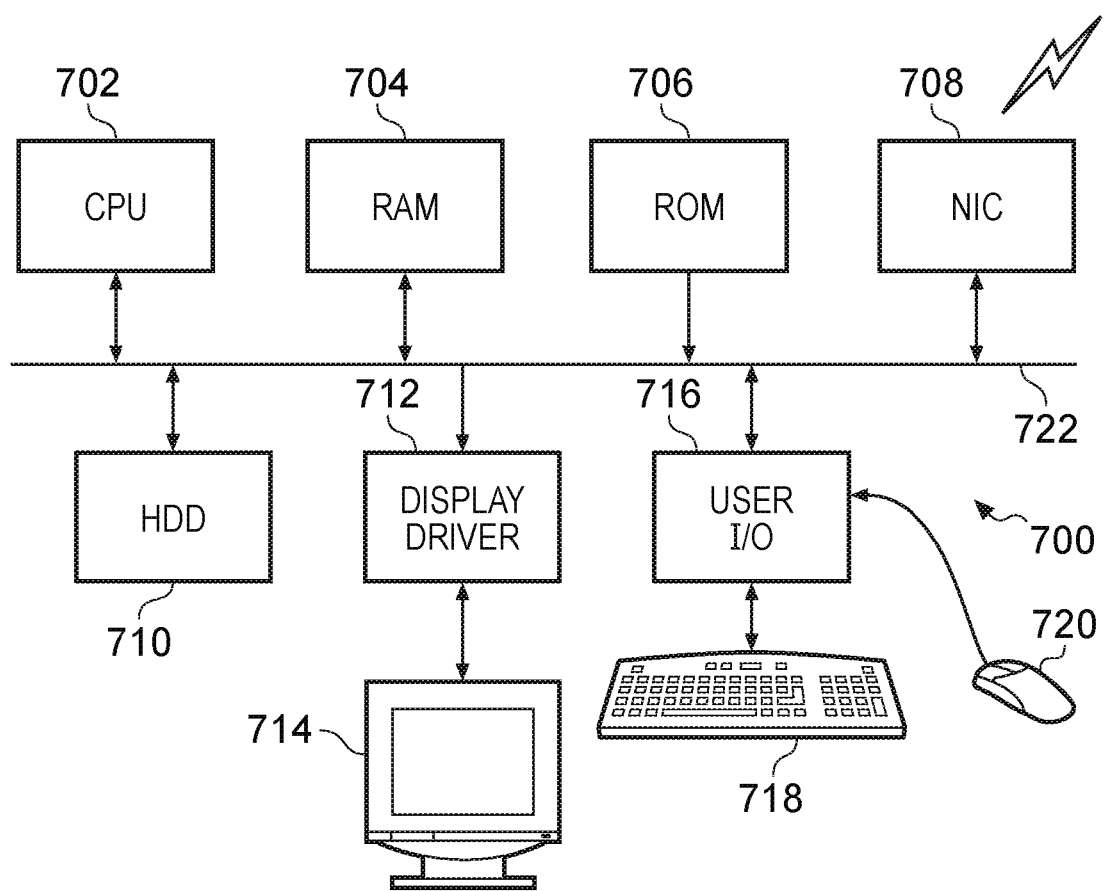
FIG. 11 is a diagram of a computer system on which one or more suitable computer programs can be executed to perform a method of determining modulation control information and a reference signal design to be used by a transmitter node in accordance with the described embodiments.

FIG. 11 schematically illustrates a general purpose computer 700 of the type that may be used to implement the above described operations for determining modulation control information and a reference signal design to be used by a transmitter node when generating a transmit signal to transmit from a logical antenna of the transmitter node over a channel of a wireless link to a recipient node. The general purpose computer 700 includes a central processing unit 702, a random access memory 704, a read only memory 706, a network interface card 708, a hard disk drive 710, a display driver 712 and monitor 714 and a user input/output circuit 716 with a keyboard 718 and mouse 720 all connected via a common bus 722. In operation, the central processing unit 702 will execute computer program instructions that may be stored in one or more of the random access memory 704, the read only memory 706 and the hard disk 710 or dynamically downloaded via the network interface card 708. The results of the processing performed may be displayed to a user via the display driver 712 and the monitor 714. User inputs for controlling the operation of the general purpose computer 700 may be received via the user input/output circuit 716 from the keyboard 718 or the mouse 720. It will be appreciated that the computer program could be written in a variety of different computer languages. The computer program may be stored and distributed on a recording medium or dynamically downloaded to the general purpose computer 700. When operating under control of an appropriate computer program, the general purpose computer 700 can perform the above described operations for determining modulation control information and a reference signal design to be used by a transmitter node when generating a transmit signal to transmit from a transmitter of the transmitter node over a channel of a wireless link to a recipient node, and hence can be considered to form an apparatus for performing the above described operations. The architecture of the general purpose computer 700 could vary considerably and FIG. 11 is only one example.

The following text provides a detailed description of the operations that may be performed by the circuitry of FIG. 6 when performing the processes of FIGS. 7A and 7B in accordance with one specific embodiment.

1) Updating First and Second Order Channel Statistics (Step 505 of FIG. 7A)

Let the channel impulse response (a first order channel statistic) at OFDM symbol number k be denoted by the vector $\tilde{h}[k]$ and be of length N, where N is the FFT size. Subscripts are used to indicate the element number. For example, the first, second and third element of $\tilde{h}[k]$ is denoted by $\tilde{h}_1[k]$, $\tilde{h}_2[k]$ and $\tilde{h}_3[k]$, respectively. The channel coefficients may be modelled similarly to the "clustered delay line" model of the fixed feeder link scenarios of the WINNER-II channel model (as described in 1ST-WINNER D1.1.2 P. Kyösti et al., "WINNER II Channel Models", ver. 1.1, September 2007, available from http://www.ist-winner.org/WINNER2-Deliverables/D1.1.2v1.1.pdf), as follows $$\tilde{h}_l[k] = \begin{cases} \frac{\sqrt{K}}{\sqrt{K+1}}\sqrt{p_1}\,e^{j\phi} + \\ \frac{1}{\sqrt{K+1}}\sqrt{p_1}\,n_1[k], & \text{for } l = 1 \\ \sqrt{p_l}\,n_l[k], & \text{for } l = 2, \ldots, L \\ 0, & \text{for } l = L+1, L+2, \ldots, N \end{cases} \quad (1)$$

where L is the channel order, K denotes the Rician K-factor, $\phi$ is uniform distributed random variable, $p=[p_1, p_2, \ldots, p_N]^T$ is power delay profile satisfying the constraint: $\Sigma_{l=1}^{N} p_l^2 = 1$, $n_l$ are independent and identically distributed (iid) circular symmetric complex Gaussian with zero mean and unit variance; independent of $\phi$. Note the first tap $\tilde{h}_l[k]$ comprises of a line-of-sight component (first term) and a non-line-of-sight component (second term).

Notation: $(.)^T$ and $(.)^H$ are used to denote the transpose and the Hermitian (conjugate) transpose operator, respectively.

Let h denote the channel frequency response (a first order channel statistic), derived by taking the N-point discrete Fourier transform (DFT) of the $\tilde{h}$. h may be computed as follows $$h = F\tilde{h} \quad (2)$$

where F is the N-point discrete Fourier transform (DFT) matrix, where the $(m, n)^{th}$ element of F is given by $$F_{m,n} = e^{-j2\pi(m-1)(n-1)/N} \quad (3)$$

The a priori mean ($\bar{h}$) and covariance ($\bar{P}$) estimates of the channel frequency response are given by $$\bar{h} := E\{h\} = 0$$

$$\bar{P} := E\{(h-E\{h\})(h-E\{h\})^H\} = E\{hh^H\} = E\{F\tilde{h}\tilde{h}^H F^H\} = FD(p)F^H \quad (4)$$

where D(p) denotes a diagonal matrix with p in its main diagonal. Clearly, the variance of the channel is a function of the power delay profile.

Illustrative Example: If N=4 and p=[0.6, 0.3, 0.1, 0.0], then $$F = \begin{bmatrix} 1 & 1 & 1 & 1 \\ 1 & -j & -1 & j \\ 1 & -1 & 1 & -1 \\ 1 & j & -1 & -j \end{bmatrix}$$

and the channel frequency response covariance becomes $$\bar{P} = FD(p)F^H = \begin{bmatrix} 1 & 1 & 1 & 1 \\ 1 & -j & -1 & j \\ 1 & -1 & 1 & -1 \\ 1 & j & -1 & -j \end{bmatrix} \begin{bmatrix} 0.6 & 0.0 & 0.0 & 0.0 \\ 0.0 & 0.3 & 0.0 & 0.0 \\ 0.0 & 0.0 & 0.1 & 0.0 \\ 0.0 & 0.0 & 0.0 & 0.0 \end{bmatrix} \begin{bmatrix} 1 & 1 & 1 & 1 \\ 1 & j & -1 & -j \\ 1 & -1 & 1 & -1 \\ 1 & -j & -1 & j \end{bmatrix}$$

$$= \begin{bmatrix} 1.0 & 0.5+0.3j & 0.4 & 0.5-0.3j \\ 0.5-0.3j & 1.0 & 0.5+0.3j & 0.4 \\ 0.4 & 0.5-0.3j & 1.0 & 0.5+0.3j \\ 0.5+0.3j & 0.4 & 0.5-0.3j & 1.0 \end{bmatrix}$$

In conclusion, the frequency selectivity, i.e. the variation of the frequency response across the subcarriers within the same OFDM symbol, is fully characterised by the a priori estimates $\bar{h}$ and $\bar{P}$. The time-selectivity, i.e. the variation of the frequency response across time, is discussed next.

State Space Model

If h[k] denotes the channel at symbol time k, then at k+1, the channel evolved as follows $$h[k+1] = A[k]h[k] + v[k] \qquad (5)$$

where v[k] is known as the system (process) noise and is assumed to be iid circular symmetric Gaussian random variable with zero mean and variance Q[k], i.e. $v[k] \sim CN(0, Q[k])$. A[k] is known as the state transition matrix. The system (process) noise and the state transition matrix are discussed for example in the publication by A. H. Jazwinski entitled "Stochastic Processes and Filtering Theory", Dover publications, 1970. Typically the state transition matrix is a diagonal matrix modelling the variation of the channel due to frequency errors. For example, if $\Delta f$ is the frequency offset, then $$A_{m,n}[k] = \begin{cases} e^{j2\pi(1+G)N\Delta f/f_s}, & \text{for } m = n \\ 0, & \text{for } m \neq n \end{cases}$$

where G denotes the cyclic prefix ratio and $f_s$ is the sampling frequency.

h[k] is not known exactly, but partially observed at specific pilot positions. The observed noise-corrupted pilots are given by $$y[k] = C^p[k]h[k] + w[k] \qquad (6)$$

where w[k] is the observation noise and assumed to be iid circular symmetric Gaussian random variable with zero mean and variance R[k], i.e. $w[k] \sim CN(0, R[k])$, independent of initial state of the channel and the process noise. $C^p[k]$ is an $m^p[k] \times N$ observation matrix indicating the pilot positions and pilot strength of pilot design p at time instant k. $m^p[k]$ denotes the number of pilots at k for the $p^{th}$ pilot design.

Illustrative Example: Considering the example of FIG. 9 and in particular the "Increased pilot density" for TX antenna 0, $m^1$ [k] is given by $$m^1[k] = \begin{cases} 2, & \text{for } k\bmod 0 \\ 2, & \text{for } k\bmod 1 \\ 1, & \text{for } k\bmod 2 \\ 1, & \text{for } k\bmod 3 \\ 2, & \text{for } k\bmod 4 \\ 2, & \text{for } k\bmod 5 \end{cases}$$

and the observation matrices are given by $$C^1[0] = \begin{bmatrix} 0 & \sqrt{2} & 0 & 0 & 0 & 0 & 0 & 0 & 0 & 0 & 0 & 0 & 0 & 0 & 0 & 0 \\ 0 & 0 & 0 & 0 & 0 & 0 & \sqrt{2} & 0 & 0 & 0 & 0 & 0 & 0 & 0 & 0 & 0 \end{bmatrix}$$

$$C^1[1] = \begin{bmatrix} 0 & 0 & 0 & 0 & 0 & 0 & 0 & 0 & 0 & \sqrt{2} & 0 & 0 & 0 & 0 & 0 & 0 \\ 0 & 0 & 0 & 0 & 0 & 0 & 0 & 0 & 0 & 0 & 0 & 0 & 0 & 0 & \sqrt{2} & 0 \end{bmatrix}$$

$$C^1[2] = \begin{bmatrix} 0 & 0 & 0 & 0 & \sqrt{2} & 0 & 0 & 0 & 0 & 0 & 0 & 0 & 0 & 0 & 0 & 0 \end{bmatrix}$$

$$C^1[3] = \begin{bmatrix} 0 & 0 & 0 & 0 & 0 & 0 & 0 & 0 & 0 & 0 & 0 & 0 & \sqrt{2} & 0 & 0 & 0 \end{bmatrix}$$

$$C^1[4] = \begin{bmatrix} 0 & \sqrt{2} & 0 & 0 & 0 & 0 & 0 & 0 & 0 & 0 & 0 & 0 & 0 & 0 & 0 & 0 \\ 0 & 0 & 0 & 0 & 0 & 0 & \sqrt{2} & 0 & 0 & 0 & 0 & 0 & 0 & 0 & 0 & 0 \end{bmatrix}$$

$$C^1[5] = \begin{bmatrix} 0 & 0 & 0 & 0 & 0 & 0 & 0 & 0 & 0 & \sqrt{2} & 0 & 0 & 0 & 0 & 0 & 0 \\ 0 & 0 & 0 & 0 & 0 & 0 & 0 & 0 & 0 & 0 & 0 & 0 & 0 & 0 & \sqrt{2} & 0 \end{bmatrix}$$

The position of the $\sqrt{2}$ symbol indicates the position of the pilot symbol, and the value $\sqrt{2}$ indicates a power boosting on the pilot subcarriers relative to the data transmit power. The term $C^1$ indicates a first pilot design and the numbers in square brackets indicate the time slots. As shown in FIG. 9, the resource block consists of six time slots, each with eighteen resource elements.

Channel Estimation Via the Kalman Filter

Filtering is the process of estimating a signal based on current and historical observations. Prediction, on the other hand, estimates a signal at a future point in time. In this embodiment, the Kalman filter (as discussed for example in the publication by A. H. Jazwinski entitled "Stochastic Processes and Filtering Theory", Dover publications, 1970) is employed to yield minimum mean square error (MMSE) estimates of the channels.

The notation h[k'|k] and P[k'|k] is used to denote prediction/filtering of the channel and its error covariance matrix, respectively. Specifically, $h[k'|k] := E\{h[k']|Y[0], y[1], \ldots, y[k]\}$ is the channel estimate at time k' based on observations up to and including time k. Similarly, $P[k'|k] := E\{(h[k']-h[k'|k])(h[k']-h[k'|k])^H|y[0], y[1], \ldots, y[k]\}$ is the channel estimation error covariance matrix at time k' based on observations up to and including time index k.

Initialisation (k=−1):
Channel $$h[-1|-1] = \bar{h} \qquad (7)$$

Channel Estimation Error $$P[-1|-1] = \bar{P} \qquad (8)$$

Prediction Phase (k≥0):
Channel $$h[k|k-1] = A[k]h[k-1|k-1] \qquad (9)$$

Channel Estimation Error $$P[k|k-1] = A[k]P[k-1|k-1]A^H[k] + Q[k] \qquad (10)$$

Filtering Phase (k>0):
Innovations (or Predicted Residual)

$$\tilde{y}[k]=y[k]-C^p[k]h[k|k-1] \quad (11)$$

Innovation Covariance $$S[k]=C^p[k]P[k|k-1]C^{p,H}[k]+R[k] \quad (12)$$

Kalman Gain $$K[k]=P[k|k-1]C^{p,H}[k]S^{-1}[k] \quad (13)$$

Updated Channel Estimate $$h[k|k]=h[k|k-1]+K[k]\tilde{y}[k] \quad (14)$$

Update Channel Estimate Covariance $$P[k|k]=P[k|k-1]-K[k]C^p[k]P[k|k-1] \quad (15)$$

Or alternatively $$P[k|k]=(I-K[k]C^p[k])P[k|k-1](I-K[k]C^p[k])^H+K[k]R[k]K^H[k] \quad (16)$$

Important observation: The error covariance matrices do not depend on channel realisations (see Eqs. 8, 10, 12, 13 and 15), instead P[k|k] is a function of the pilot design observation matrices $C^p[k]$, and is dependent on the knowledge of the following second order channel statistics:

The frequency-selective a priori channel covariance matrix $\bar{P}$,
The time-selective process noise covariance matrix Q[k], and
The measurement noise covariance matrix R[k].

Whilst the above description discusses the steps taken to implement step 505 of FIG. 7A, in one embodiment a subset of these steps can also be performed to implement step 525 of FIG. 7B in order to compute the channel estimation errors. In particular, in one embodiment, the computations of equations 15 or 16 can be re-performed in order to implement step 525.

2) Signal to Noise Ratio Calculations (Step 530 of FIG. 7B)

The received signal on the $l^{th}$ data subcarrier at symbol number k, is simply given by $$y_l[k]=h_l[k]d_l[k]+w_l[k] \quad (17)$$

Substituting the channel estimate $h_l[k|k]$ and the channel estimation error $\Delta h_l[k|k]$ into Eq. 17, gives:

$$\begin{aligned} y_l[k] &= (h_l[k|k]+\Delta h_l[k|k])d_l[k]+w_l[k] \\ &= h_l[k|k]d_l[k]+(\Delta h_l[k|k]d_l[k]+w_l[k]) \\ &= h_l[k|k]d_l[k]+\omega_l[k] \end{aligned} \quad (18)$$

The noise term $\omega_l[k]$ is modelled as a circular symmetric Gaussian random variable with zero mean and variance $\sigma_l^2[k]$, i.e. $\omega_l[k]\sim CN(0,\sigma_l^2[k])$, since $$\begin{aligned} E\{\omega_l[k]\} &= E\{\Delta h_l[k|k]d_l[k]+w_l[k]\} = E\{\Delta h_l[k|k]\}E\{d_l[k]\}+E\{w_l[k]\} \\ &= 0 \end{aligned} \quad (19)$$

$$\begin{aligned} \sigma_l^2[k] &= E\{|\omega_l[k]|^2\} = E\{|\Delta h_l[k|k]|^2\}E\{|d_l[k]|^2\}+E\{|w_l[k]|^2\} \\ &= P_{l,l}[k|k]+R_{l,l}[k] \end{aligned} \quad (20)$$

The derivation of Eqs. 19 and 20 relied on the reasonable assumption of the mutual independence between the observation noise, the channel estimation errors and the transmitted data. In addition the signal power is normalised to one, i.e. $E\{|d_l[k]|^2\}=1$. Furthermore, Eq. 20 suggests that the variance of the observation noise, post channel estimation, is additionally burdened by a term equal to the channel estimation error variance $P_{l,l}[k|k]$. Note, $R_{l,l}[k]$, is the noise variance on the $l^{th}$ subcarrier in the absence of channel estimation errors.

The Signal to Noise Ratio (SNR) $\gamma_l[k]$ on subcarrier l at time symbol k, is thus given by $$\gamma_l[k]=\frac{|h_l[k|k]|^2}{P_{l,l}[k|k]+R_{l,l}[k|k]} \quad (21)$$

The SNR of calculation in Eq. 21 is valid for SISO channels. As will be understood by those skilled in the art, extending the result to SIMO and MIMO with spatial multiplexing of space time coding is straightforward.

3) Effective Signal to Noise Ratio and Bler Calculations (Steps 545 and 550 of FIG. 7B)

The concept of Effective SNR first appeared in the paper by Nanda, Sanjiv and Rege, Kiram M. entitled "Frame Error Rates for Convolutional Codes on Fading Channels and the Concept of Effective Eb/NO", IEEE Transactions on Vehicular Technology. 1988, Vol. 47, No. 4, pp. 1245-1250. The aim is to derive a function that maps/compresses a vector of post-processing SNRs (one per each sub-carrier measured at the input of the FEC decoder) into an instantaneous scalar ESNR. This mapping is termed effective SNR mapping (ESM). With the knowledge of the selected MCS and the block size, the BLER predictor takes the ESNR as an input and yields an estimate of the expected BLER.

As previously discussed, FIG. 8 shows the functional blocks required to predict the BLER. The SNR of data subcarriers are rearranged into blocks of length N. The ESNR block then yields a scalar value $\bar{\gamma}$. Based on the ESNR, the desired MCS and the block size, BLER prediction is achieved using a pre-computed family of BLER vs SNR curves. The BLER curves are generated under frequency non selective (AWGN) fading conditions.

For a large class of methods, the general ESM can be described as follows:

$$f\left(\frac{\bar{\gamma}}{\alpha_1}\right)=\frac{1}{N}\sum_{n=1}^{N}f\left(\frac{\bar{\gamma}_n}{\alpha_2}\right) \quad (22)$$

where, f(.) is the invertible mapping function, $\bar{\gamma}$ denotes the effective SNR, and N is the number of sub-carriers used to transmit the coded FEC block. Finally, the constants $\alpha_1$ and $\alpha_2$ may depend on the current MCS.

Known ESM methods are:
1. Exponential Effective SINR Mapping (EESM) (see Document R1-03-1303, System-level evaluation of OFDM—further considerations. 3GPP TSG-RAN-1, Ericsson. Lisbon: Meeting #35, November, 2003).
2. Received Bit Mutual Information Rate (RBIR) ESM (see the paper by Wan, Lei, Tsai, Shiauhe and Almgren, Magnus. Entitled "A Fading-Insensitive Performance Metric for a Unified Link Quality Model", Wireless Communications and Networking Conference. 2006, Vol. 4, pp. 2110-2114).
3. Mean Mutual Information per Bit (MMIB) ESM (see the paper by Sayana, Krishna, Zhuang, Jeff and Stewart, Ken entitled "Link Performance Abstraction based on Mean Mutual Information per Bit (MMIB) of the LLR Channel", IEEE C802.16m-07/097).

4. Capacity ESM (CESM) (see the paper by Cioffi, John M. entitled "A Multicarrier Primer", available at http://www-.stanford.edu/group/cioffi/documents/multicarrier.pdf).

The EESM is derived from the Chernoff bound on the probability of error. The ESM for the second and third method is derived from the constraint (mutual information) capacity formula. In particular, the RBIR method computes the mutual information per received symbol and then the derived value is normalised to yield the bit mutual information. On the other hand, the MMIB method derives the bit mutual information directly from the log-likelihood ratios. Finally, the CESM is based on the Shannon capacity formula.

Thus, for each pilot design, given the SNR values ($\gamma_n$, n=1, . . . , N), an effective SNR can be computed for each coding and modulation scheme utilizing Eq. 22. Using the AWGN lookup tables, the BLER for each MCS can then be predicted.

4) Goodput Calculation (Step 555 of FIG. 7B)

As previously discussed, at step 555, the goodput for any particular combination of MCS option and pilot design option may be calculated by the following equation:

(1−BLER)×(1−pilot density)×(MCS spectral efficiency).

That goodput value is then stored within the quality indications storage 475. This process is repeated for every combination of MCS option and pilot design option.

The MCS with the highest goodput is selected as a candidate MCS for the specified pilot design. The overall optimal pilot design is the one that yield the highest goodput.

From the above description of embodiments, it will be appreciated that such embodiments enable quality indications to be established for each combination of possible reference signal design and possible modulation control information, and hence not only is the inherent channel estimation accuracy achievable using each possible reference signal design considered, but also the data transmission efficiency and robustness to channel effects of each possible modulation control information is also taken into account. Hence, for each channel, a combination of reference signal design and modulation control information can be chosen so as to optimise the net throughput. Further, the process can be repeated as and when required in order to ensure that the combination of reference signal design and modulation control information is modified as necessary to seek to maintain an optimised net throughput in the presence of time varying channel effects.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A method of determining modulation control information and a reference signal design to be used by a transmitter node when generating a transmit signal to transmit from a transmitter of the transmitter node over a channel of a wireless link to a recipient node, the modulation control information being used by the transmitter node to convert source data into an information bearing signal, and the information bearing signal being combined with a reference signal conforming to the reference signal design in order to produce said transmit signal, the method comprising:

a) selecting a candidate reference signal design from a plurality of candidate reference signal designs;
b) determining channel state information for said channel, said channel state information comprising a channel estimate providing an indication of how channel effects will modify the transmit signal as it is transmitted over said channel, and the channel state information further comprising an estimated error in the channel estimate and an estimate of noise experienced within said channel, at least the estimated error being determined based on said selected candidate reference signal design;
c) determining, from the channel state information, signal to noise ratio information for said channel;
d) for each of a plurality of candidate modulation control information, using the signal to noise ratio information to determine a quality indication for said channel;
e) repeating said steps (a) to (d) for each candidate reference signal design in said plurality;
f) selecting a winning quality indication from the determined quality indications; and
g) outputting to the transmitting node the combination of candidate reference signal design and candidate modulation control information associated with the winning quality indication.

2. A method as claimed in claim 1 wherein the transmit signal is transmitted over said channel within a plurality of resource elements, and said method comprises:
determining at said step (b), as the channel state information for said channel, channel state information for each resource element.

3. A method as claimed in claim 2, wherein said method comprises:
at said step (c), calculating a vector providing separate signal to noise information for each resource element.

4. A method as claimed in claim 1, wherein said reference signal design is a pilot signal design identifying at least locations at which pilots are to be included within the transmit signal.

5. A method as claimed in claim 4, wherein the transmit signal is transmitted over said channel within a resource block comprising a plurality of resource elements, and the pilot signal design identifies which resource elements are to contain pilots.

6. A method as claimed in claim 5, wherein said pilots are pilot symbols, each pilot symbol occupying one resource element.

7. A method as claimed in claim 4, wherein said reference signal design further identifies a transmit power to be used for transmitting said pilots within the transmit signal.

8. A method as claimed in claim 1, wherein said modulation control information identifies at least a constellation mapping to be used to generate said information bearing signal from a coded version of the source data.

9. A method as claimed in claim 8, wherein said modulation control information further identifies a channel coding to be used to convert the source data into the coded version of the source data.

10. A method as claimed in claim 1, wherein at said step (b) the channel estimate is obtained by a channel sounding process.

11. A method as claimed in claim 10, wherein said channel sounding process is performed by a network controller of a wireless network in which the transmitter node and recipient node reside.

12. A method as claimed in claim 1, wherein at said step (b) the channel estimate is determined by the recipient node from a reference signal extracted from a received transmit signal.

13. A method as claimed in claim 1, wherein at said step (b) said estimated error in the channel estimate is determined based on the selected candidate reference signal design and statistical data forming at least part of said channel estimate.

14. A method as claimed in claim 13, wherein the estimated error in the channel estimate is determined by calculating an error covariance matrix based on a predetermined feature of the selected candidate reference signal design and second order channel statistics provide in the channel estimate.

15. A method as claimed in claim 14, wherein:
each candidate reference signal design is a pilot signal design identifying at least locations at which pilots are to be included within the transmit signal;
said predetermined feature of the selected candidate reference signal design used in calculating the error covariance matrix is an observation matrix indicating the locations and strength of the pilots to be included within the transmit signal in accordance with that selected candidate reference signal design.

16. A method as claimed in claim 13, wherein at said step (b) said estimated error in the channel estimate is determined using a Kalman filter operation.

17. A method as claimed in claim 1, wherein the method is performed within a network controller of a wireless network in which the transmitter node and recipient node reside.

18. A method as claimed in claim 1, wherein the method is performed within the recipient node.

19. A method as claimed in claim 1, wherein said transmitter is a logical antenna.

20. A method as claimed in claim 1, wherein the wireless link provides a channel for each logical antenna of the transmitter node, and the method determines modulation control information and a reference signal design to be used for each channel of the wireless link between the transmitter node and the recipient node.

21. A method as claimed in claim 1, wherein at said step (d) the quality indication determined is an indication of net throughput of the source data.

22. A method as claimed in claim 21, wherein said step (d) comprises, for each of said plurality of candidate modulation control information, determining a block error rate prediction based on the signal to noise ratio information for the channel, and then performing a throughput determination operation on the block error rate prediction in order to determine said indication of net throughput.

23. A method as claimed in claim 22, wherein:
each candidate reference signal design is a pilot signal design identifying at least locations at which pilots are to be included within the transmit signal; and
said throughput determination operation employs as inputs the block error rate prediction, an indication of the density of said pilots to be included in the transmit signal, and a spectral efficiency indication of the candidate modulation control information.

24. A method as claimed in claim 23, wherein said throughput determination operation performs the computation:

$$\text{indication of net throughput} = (1-\text{BLER}) \times (1-\text{PD}) \times \text{MC\_SE}$$

where BLER is the block error rate, PD is the pilot density for the selected candidate reference signal design, and MC_SE is the spectral efficiency of a currently selected candidate modulation control information.

25. A method as claimed in claim 24, wherein:
said step (f) comprises selecting as the winning quality indication the indication of net throughput that has the highest value from amongst all of the indications of net throughput calculated through performance of said steps (a) to (e).

26. A method as claimed in claim 22, further comprising:
at said step (c), calculating a vector providing separate signal to noise information for each resource element; and
during said step (d), the step of determining a block error rate prediction comprises mapping said vector into a scalar effective signal to noise ratio using a selected block size identifying the number of resource elements considered to form a block, and then computing the block error rate prediction using the scalar effective signal to noise ratio, the block size and at least one parameter determined from a currently selected candidate modulation control information.

27. A method as claimed in claim 1, wherein said steps (a) to (d) are performed at least partially in parallel for different combinations of candidate reference signal design and candidate modulation control information.

28. A method as claimed in claim 1, wherein the channel estimate identifies one of a channel frequency response and a channel impulse response.

29. A method as claimed in claim 1, wherein said steps (a) to (g) are repeated on occurrence of at least one trigger condition.

30. A storage medium storing a computer program which, when executed on a computer, performs a method of determining modulation control information and a reference signal design to be used by a transmitter node as claimed in claim 1.

31. A system for determining modulation control information and a reference signal design to be used by a transmitter node when generating a transmit signal to transmit from a transmitter of the transmitter node over a channel of a wireless link to a recipient node, the modulation control information being used by the transmitter node to convert source data into an information bearing signal, and the information bearing signal being combined with a reference signal conforming to the reference signal design in order to produce said transmit signal, the system comprising:
storage configured to store a plurality of reference signal designs;
channel estimation and estimation variance circuitry configured to determine channel state information for said channel, said channel state information comprising a channel estimate providing an indication of how channel effects will modify the transmit signal as it is transmitted over said channel, and the channel state information further comprising an estimated error in the channel estimate and an estimate of noise experienced within said channel, at least the estimated error being determined based on a selected candidate reference signal design from said storage;
signal to noise ratio evaluation circuitry configured to determine, from the channel state information, signal to noise ratio information for said channel;
quality indication determination circuitry configured, for each of a plurality of candidate modulation control information, to use the signal to noise ratio information to determine a quality indication for said channel;
the operations of the channel estimation and estimation variance circuitry, the signal to noise ratio evaluation circuitry and the quality indication determination circuitry being performed for each candidate reference signal design in said plurality; and
selection circuitry configured to select a winning quality indication from the determined quality indications, and to output to the transmitting node the combination of candidate reference signal design and candidate modulation control information associated with the winning quality indication.

32. A system for determining modulation control information and a reference signal design to be used by a transmitter node when generating a transmit signal to transmit from a transmitter of the transmitter node over a channel of a wireless link to a recipient node, the modulation control information being used by the transmitter node to convert source data into an information bearing signal, and the information bearing signal being combined with a reference signal conforming to the reference signal design in order to produce said transmit signal, the system comprising:

storage means for storing a plurality of reference signal designs;

channel estimation and estimation variance means for determining channel state information for said channel, said channel state information comprising a channel estimate providing an indication of how channel effects will modify the transmit signal as it is transmitted over said channel, and the channel state information further comprising an estimated error in the channel estimate and an estimate of noise experienced within said channel, at least the estimated error being determined based on a selected candidate reference signal design from said storage;

signal to noise ratio evaluation means for determining, from the channel state information, signal to noise ratio information for said channel;

quality indication determination means, for each of a plurality of candidate modulation control information, for using the signal to noise ratio information to determine a quality indication for said channel;

the operations of the channel estimation and estimation variance means, the signal to noise ratio evaluation means and the quality indication determination means being performed for each candidate reference signal design in said plurality; and selection means for selecting a winning quality indication from the determined quality indications, and for outputting to the transmitting node the combination of candidate reference signal design and candidate modulation control information associated with the winning quality indication.

\* \* \* \* \*